United States Patent
O'Neill et al.

(10) Patent No.: US 8,472,945 B2
(45) Date of Patent: Jun. 25, 2013

(54) EVENT PROCESSING SYSTEM

(75) Inventors: Dominic O'Neill, Bristol (GB); Mike Eales, Bristol (GB); George Piyiakis, Athens (GR); Benomy Tutcher, Bristol (GB); Mark Evans, Bristol (GB)

(73) Assignee: France Telecom SA, Paris (FR)

( * ) Notice: Subject to any disclaimer, the term of this patent is extended or adjusted under 35 U.S.C. 154(b) by 991 days.

(21) Appl. No.: 11/547,985

(22) PCT Filed: Apr. 7, 2005

(86) PCT No.: PCT/GB2005/001347
§ 371 (c)(1),
(2), (4) Date: Sep. 17, 2007

(87) PCT Pub. No.: WO2005/099239
PCT Pub. Date: Oct. 20, 2005

(65) Prior Publication Data
US 2008/0146201 A1    Jun. 19, 2008

(30) Foreign Application Priority Data

Apr. 7, 2004    (GB) .................................. 0407937.2
Sep. 7, 2004    (GB) .................................. 0419834.7

(51) Int. Cl.
*H04W 40/00* (2009.01)
(52) U.S. Cl.
USPC ...... 455/428; 455/414.1; 455/433; 455/435.1

(58) Field of Classification Search
USPC ............................ 455/414.1, 428, 433, 435.1
See application file for complete search history.

(56) References Cited

U.S. PATENT DOCUMENTS
2003/0061268 A1    3/2003    Moerdijk et al.

FOREIGN PATENT DOCUMENTS
| WO | WO 97/50232 | 12/1997 |
| WO | WO 01/31935 | 5/2001 |
| WO | WO 0131935 A1 * | 5/2001 |
| WO | WO 02/19729 | 3/2002 |

OTHER PUBLICATIONS

International Search Report issued on Aug. 23, 2005 in PCT/GB2005/001347 filed on Apr. 7, 2005.

* cited by examiner

*Primary Examiner* — Steve D Agosta
(74) *Attorney, Agent, or Firm* — Knobbe Martens Olson & Bear, LLP

(57) ABSTRACT

Embodiments are concerned with method and a system for event processing in a communications network, and are suited to coordinating the provision of services in response to service initiation triggers. Embodiments are particularly applicable for use in controlling operation of service nodes, each of which is arranged to provide a particular service in a mobile network, or a fixed network or a combination of the two.

37 Claims, 23 Drawing Sheets

EVENT PROCESSING SYSTEM

FIELD OF THE INVENTION

The present invention relates to a method and a system for event processing in a communications network, and is particularly, but not exclusively, suited to coordinating the provision of services in response to service initiation triggers. Embodiments of the invention are particularly applicable for use in controlling operation of service nodes, each of which is arranged to provide a particular service in a mobile network, or a fixed network or a combination of the two.

BACKGROUND OF THE INVENTION

A typical mobile operator comprises two or more operating partners, each of which offers bespoke network services. As a result the operating partners, viewed as a whole, often comprise different and diverse services and corresponding service equipment. The responsibility for development, integration and operation of the network services lies within each individual operating partner, and providing this variety is typically extremely costly for the operator when viewed as a whole, since the costs associated with developing, supporting and marketing the various services can be significant. Moreover, when faced with the task of integrating various network services, the network operator has several awkward problems to overcome, not least due to the fact that legacy service applications are typically not upward compatible, and, as already mentioned, many of the network services are developed and administered by different service providers.

FIG. 1 is a schematic diagram showing a conventional mobile network arrangement comprising a Mobile Station MS, serving node switch network component MSC, and Home Location Register HLR, together with various nodes IN1, IN2, IN3, each arranged to provide an Intelligent Network service. The MSC is arranged to send messages to, and receive messages from, the service nodes IN1, IN2, IN3 in accordance with service parameter data received from the Home Location Register HLR upon registration of the Mobile Station MS with the MSC or in accordance with settings that are statically configured within the home network. While the MS is registered with the MSC, the MSC monitors for occurrences of service triggers (so-called Detection Points (DP)), and, when a trigger is identified, the switch MSC contacts whichever service node is associated with the trigger. In some known systems, each service IN1, IN2, IN3 operates independently of one another (e.g. each service may be provided by a different service provider), and it is often the case that different services are designed to respond to the same trigger. Typically, in such situations the MSC simply activates one of the network services, thereby effectively failing to provide the MS with the other services. International patent publication number WO97/50232 describes a system that is designed to mitigate this problem, and describes a network having a so-called mediation point, which has access to services corresponding to the same trigger, together with rules determining interoperation thereof, and controls invocation of the various services from a single point. However, WO97/50232 requires applications to be categorised into simple classifications and only allows a preconfigured and tabulated set of interactions between services, which is prescriptive and inflexible. Furthermore, each service can only be invoked in accordance with the rule, i.e. once only in respect of a given trigger.

In addition to the existence of different service nodes competing for the same trigger, technical convergence between the telecommunications, computing and multimedia domains has given rise to a new environment for the development and provision of telecommunications services. This has compelled both telecom operators and service providers to develop and deploy new residential and enterprise services and applications. To meet this challenge operators and service providers have sought to replace closed, proprietary systems with standardised, open, interoperable and common platforms, and at least some of the aforementioned services are embodied on such open platforms.

Parlay is an open multi-vendor consortium formed to develop such open technology independent APIs, enabling Internet Service Vendors, network device vendors, software developers, service providers, ASPs and enterprises to create applications that can run across multiple mobile and fixed carrier networks. The Parlay/OSA (Open Service Architecture) standard defines an API (application programming interface) that is technology agnostic and configured to use protocols and technologies such as SIP (Session Initiation Protocol), JAIN (Java APIs for Intelligent Networks) and Web Services to communicate with third party devices and services in different domains.

Whilst this framework has greatly improved the interoperability of services, there are, nevertheless, implementation issues associated with disparate services registering for interest in network events. In the following description is it assumed that "an application/service registering for interest in . . . " means "an application/service is arranged to react to . . . ", and that "a network event" means, for example, a trigger from the network (or indeed another service or application node) in respect of a specified destination and source address.

There are currently 14 Service Control Functions (SCF), including various generic call control (GCC) and multi party call control (MPCC) SCFs; between them, the GCC/MPCC SCFs map to all of the Intelligent Network (IN) messages, and can therefore invoke all of the network capabilities. Using the Parlay APIs, any given service can register and deregister for network events (by means of e.g. for GCC SCFs, enableCallNotification( ) and disableCallNotification( ) methods respectively and for MPCC SCFs, by means of createNotification( ) and destroyNotification( ) methods respectively) each registration request corresponding to one or more subscribers (source address) and/or destination address(es) (e.g. a specified number in the case of number translation services). A simplified representation of the network and OSA domains is shown in FIG. 2, and an example of the routing of GCC registration messages between OSA and network devices is shown in FIG. 3. In this example an application App1 is arranged to check the balance of specified subscribers prior to allocation of network resources, and accordingly App1 invokes the enableCallNotification( ) method each time it determines that a subscriber's balance needs checking prior to allocating network resources in respect of the requested service. This results in a MAP AnyTimeModification( ) message being sent to the HLR in order to activate the necessary subscription information (O-CSI, D-CSI (activated in relation to the subscriber's address)). Having successfully registered for this network event, when such a specified subscriber subsequently requests a service (i.e. O-CSI (data identifying the subscriber)), App1 is invoked and used to control at least the initial part of the service provision procedure.

The enableCallNotification( ) method is purely intended for applications to indicate their interest to be notified when certain call events take place. It is possible to subscribe to a certain event for a whole range of addresses, e.g. the application can indicate it wishes to be informed when a call is made to any number starting with 800. If an application has already requested notifications with criteria that overlap the specified criteria, the request is refused with, for example, P_GCCS_INVALID_CRITERIA for a GCC registration message and P_INVALID_CRITERIA for an MPCC registration message. The criteria are said to overlap if both originating and terminating destination addresses overlap and the same number plan is used and the same CallNotificationType (e.g. network trigger) is used. As a result, in most configurations only one application can place a request for a given set of criteria.

British Telecommunications Exact Technologies has identified that having a hard and fast rule of "any overlap-no-coexistence" is overly restrictive and has presented a solution whereby the Parlay GW comprises a Policy Management Service Capability Function (SCF), arranged to cooperate with the Call Control SCF shown in FIG. 2 when an application attempts to register with the gateway. Their Policy Management SCF manages a store of user profiles in which details of services to which a given subscriber has access, together with the respective trigger events, are stored. The user profiles are populated only after the Policy Management SCF has checked that applications can co-exist, their co-existence having been checked by means of a feature interaction processing function which is provisioned with meta-data specifying application interaction rules (so-called "feature interaction" rules). This solution therefore requires rules specifying interactions between applications and services to be pre-stored and accessible in response to application registration requests. When a network event is subsequently received from the network, the Call Control SCF accesses whichever user profile corresponds to the subscriber associated with the network event and retrieves details of applications and services stored therein, controlling their respective invocation sequentially. There are several problems with this solution, not least resulting from the fact that registration requests are resolved in view of that/those application(s) that have already registered. The short comings of this solution can be seen from consideration of the following scenario, in which a first application A has registered for the user, the user profile having been updated to include data indicative of application A. If a registration request is subsequently received from application B, and if the interaction rules indicate that A is incompatible with B the registration request from application B will fail. If, subsequently, application A de-registers for the subscriber, there is no means of re-capturing application B, even though there is now no reason why the subscriber cannot receive service from application B.

It is an object of the invention to provide an improved level of integration and flexibility for network services.

SUMMARY OF THE INVENTION

According to a first aspect of the present invention there is provided event processing apparatus for use in processing service initiation request messages in an event processing system, the apparatus being connectable to a plurality of service nodes from which a subscriber is able to receive service during processing of a network event, each said service node being capable of transmitting a service response message comprising data particular to operation of the service node, the apparatus comprising a function arranged, on receiving a first service initiation request message sent by a serving node in a network currently involved in processing of said network event, to request service response messages from a plurality of service nodes, and to control operation of at least some of said plurality of service nodes involved in processing of the same network event on the basis of data contained in said service response messages.

During processing of a network event such as a call, this aspect opens up the possibility of coordinating operation of, for example, a first service node, which, during execution, depends on the content of data from another (second) service node as part of processing a network event, with said other service node. Any given service node effectively appears as an open system to the apparatus, meaning that the apparatus can interact with the service node at one or more point(s) during processing of a network event.

Embodiments of the invention also provide a means of integrating the functionality from different services in accordance with selectable predetermined rules and conditions. Preferably the rules are retrieved in response to receipt of the service initiation request message and can include, for example, setting up conditional waiting events and rules that specify which service node to invoke when the waiting conditions have been met. The apparatus thereby provides a flexible means of processing a network event, wherein the services are effectively "mixed and matched" dynamically in accordance with the selected rules and conditions data.

Conveniently, the function can be configured to control operation of a given service node more than once during the same network event on the basis of the content of a said service response message. The function is effectively involved throughout the dialogue between the various service nodes and serving nodes; this is completely different from known systems such as that described in WO97/50232, in which subsequently received triggers can only be treated as separate events, causing the mediation point to perform a look up of services as if the trigger in question were received as part of an unrelated network event. This feature is particularly beneficial for use with services that require alerts in response to various events (such as when a called party is engaged or unavailable), and which can be queried on a plurality of occasions, each time responding with alternative contact details for a called party.

In one arrangement the function conveys data indicative of one or more service initiation triggers in a service request message to a respective service node, the triggers being either that or those sent from the serving node to the apparatus and/or a trigger modified by the function. The function can also modify data such as service keys, protocols, and/or called digits that accompany the service initiation request, either on the basis of the retrieved data, and/or on the basis of the content of service response messages received from service nodes involved in the network event. Subsequent service request messages can then be formulated on the basis of the modified data. A particular advantage of providing the means to modify the triggers is that the range of functionality actionable by the function is improved over that possible with known systems, because different services and applications respond to different triggers. Essentially, by changing the triggers involved in a given network event, the number of services (and thus range of functionality) that can be invoked in relation to the network event increases. In addition the function can be arranged to monitor for receipt of further service initiation request messages—in particular, trigger data—as a result of the operation, and control operation of service nodes on the basis of data retrieved corresponding to the newly received trigger data.

In some cases a service node might, in a service response message, request initiation request messages such as trigger points which would otherwise conflict with similar requests from other service nodes involved in the network event. Such potential conflicts can be avoided by recourse to preference data specifying an order of precedence between, and conditions dependent upon, data received from said different service nodes. The apparatus thereby ensures that all subsequently transmitted initiation request messages (or service invocation messages) associated with the network event are conflict-free.

More specifically, in response to receiving said first service initiation request message, the apparatus is arranged to transmit second service initiation request messages to two or more of said service nodes in a selected sequence. This sequence is selected in accordance with specified call processing logic, and includes events that are dependent on responses from one or more said service nodes. For example, the apparatus can be arranged to process a service node response message from a first service node before transmitting a second service initiation request message to a second service node.

Preferably the call processing logic is stored in a data storage system that is accessible by the apparatus and is arranged to store data in respect of a plurality of subscribers. In one arrangement the stored data includes service data specifying services provided by a plurality of said service nodes, and one or more conditions specifying a relationship between said services. This relationship between the services effectively defines the call processing logic and is indexed in accordance with the service initiation triggers.

Examples of service initiation triggers include, and are not limited to, events and triggers associated with call control, interaction and messaging carried by such protocols as Camel and Intelligent Network detection points (INAP, extended INAP, CAP); MAP events such as Location Update and ForwardSM messages; events associated with sending of data messages such as MMS and SMS messages; configuration numbers (e.g. B#) and SIP events such as those carried by MSCML, VXML, CCXML, and NETANN.

In one arrangement, one of the service nodes is a gateway node providing access to a plurality of further service nodes beyond the gateway; preferably the apparatus comprises an interface component arranged to provide access, via the gateway node, thereto. The further service nodes can then be arranged to discover the functionality of the apparatus, and use the discovered information to proactively design services in accordance therewith.

In summary, the apparatus can be viewed as operating in two modes: a first, in which actionable data corresponding to the service initiation request are retrieved; and a second, in which the apparatus invokes service nodes on the basis of the retrieved data, the second mode also including monitoring for, and acting upon, data received from the actioned service nodes in the form of service response messages.

In one arrangement, on receiving a second service initiation request message sent by a serving node in the network currently involved in processing of the same network event, the function can control operation of at least one of said plurality of service nodes, and as a result of the operation, transmit a service response message to the serving node from which the second service initiation request message is received. The first and second service initiation request messages could be sent from the same or different serving nodes; the apparatus could, for example, be used to transfer event processing from a serving node in a visitor network to a serving node in the home network in any of the following scenarios: during provision of International Seamless Voice Service; while translating a short number to a full connection number; while effecting various messaging services and any combination of these and other known and future disparate services.

In accordance with a second aspect of the present invention there is provided an Event Processing System for processing service initiation triggers, the Event Processing System comprising:

a plurality of service nodes from which a subscriber is able to receive service during processing of a network event;

a serving node arranged to store data defining a set of different service initiation triggers for a subscriber, each said service initiation trigger corresponding respectively to a different first service initiation request message;

a storage system arranged to store data in respect of a plurality of subscribers, the stored data including service data specifying services available from a plurality of said service nodes, and one or more conditions specifying a relationship between said services;

a processing system arranged, in response to receipt of said first service initiation request messages sent from said serving node in respect of the subscriber, to retrieve service data associated with the subscriber from said storage system, wherein the processing system is arranged to transmit at least one second service initiation request messages to each of a predetermined set of different service nodes in accordance with the retrieved data.

In this aspect of the invention the storage system can be physically and logically separate from the processing system, which means that updates to the service data and conditions that specify relationships between the services can be modified completely independently of both the operation of the processing system and message transfer between service nodes, serving node and processing system.

In accordance with a third aspect of the invention there is provided apparatus for processing service initiation request messages in an Event Processing System, the apparatus being connectable to a serving node in a network involved in processing a network event and to a plurality of service nodes from which a subscriber is able to receive service during processing of the network event, the serving node being capable of storing data defining a set of different service initiation triggers for a subscriber and of transmitting a set of first service initiation request messages to a plurality of different service nodes, each said first service initiation request message corresponding respectively to a different one of said service initiation triggers, wherein the apparatus is responsive to different said first service initiation request messages during processing of the same network event, and is arranged to transmit at least one second service initiation request message to each of a predetermined set of different service nodes in response to receiving one said service initiation request message.

Apparatus configured according to the third aspect can respond to different triggers received during the same network event and identify the triggers as being part of the same network event. This provides a particularly convenient way of controlling, for example, switching devices associated with a call, and transferring a call between different networks, from which different triggers can be received during processing of the same call.

Furthermore in arrangements of this aspect of the invention, a serving node, such as a switch, transmits a first service initiation request message to the apparatus, which is able to send second service initiation messages to two or more service nodes. These second service initiation messages can be the same as the first service initiation request message, and any one second service initiation message can be the same as, or different to, another second service initiation message.

According to a further aspect of the present invention there is provided apparatus for processing service initiation request messages in a network event processing system, the apparatus being connectable to a plurality of service nodes from which a subscriber is able to receive service during processing of a call, and comprising a function arranged, on receiving a first service initiation request message sent by a serving node in a network currently involved in processing of a call, to control operation of at least one of said plurality of service nodes, wherein, as a result of the operation, the function is arranged to generate a first service response message and to transmit same to the serving node from which the first service initiation request message is received, and on receiving a second service initiation request message sent by a serving node in the network currently involved in processing of the same network event, the function is arranged to resume control of at least one of said plurality of service nodes.

This aspect of the invention enables the apparatus to remain involved in processing of a network event after handling of the event has passed between different serving nodes in the network. Typically the apparatus will be configured to monitor for receipt of the second service initiation request message and will resume control of event processing when the second request message is received.

According to a further aspect of the invention there is provided apparatus for processing service initiation request messages in a network event processing system, the apparatus being connectable to a serving node in a network involved in processing of the network event and to a plurality of service nodes from which a subscriber is able to receive service during processing of said network event, the serving node being capable of storing data defining a set of different service initiation triggers for a subscriber and of transmitting individual ones of a set of first service initiation request messages to the apparatus, each said first service initiation request message corresponding respectively to a different one of said service initiation triggers, wherein the apparatus is responsive to one of said first service initiation request messages so as transform the associated service initiation trigger into data indicative of a second service initiation trigger, and to request a service response message from at least one said service node on the basis of the second service initiation trigger This aspect is particularly convenient for situations in which the set of triggers available to serving node (switch) does not include triggers corresponding to certain services. In arrangements of this aspect of the invention, the apparatus transforms the trigger data that it receives, preferably using data included in the service initiation request message such as the called party ID, to progress network events that would otherwise fail to be correctly handled; one such example is the processing of B# calls, for which the required set of triggers are only provided to switching devices in CAMEL 3-enabled networks. Another example is the processing of a fixed line operator number, a range of numbers, a mobile operator number or a range of numbers, each corresponding to a particular service or range of services.

In accordance with a yet further aspect of the invention there is provided a mobile network comprising a plurality of said event processing apparatus, each comprising one or more gateway service nodes arranged to provide access to further service nodes. Advantageously the mobile network is arranged such that any one of the gateways can access any one of the further service nodes, thereby providing a consolidated set of services for the mobile network.

Embodiments of the invention can be applied to control, directly, said one or more other service nodes accessibly via the gateway service node. Thus, advantageously, the invention can be implemented on what is effectively "the other side of the gateway" and control operation of, for example, OSA service applications.

It is to be noted that in general each service node is configured to provide a specific network service, and in the following description, this is referred to as network service and/or service application.

In accordance with a further aspect of the present invention there is provided apparatus for processing service registration request messages in an event processing system, each said service registration request message including registration data identifying a service node, a service initiation trigger and a subscriber in respect of whom the registration request relates, the apparatus being connectable to a serving node in a network involved in event processing and to a service node from which a subscriber is able to receive service during event processing, the serving node being capable of transmitting a plurality of service initiation request messages to said apparatus, each service initiation request message corresponding respectively to a different service initiation trigger, wherein the apparatus is responsive to receipt of one of said service registration request messages sent from a registering service node to store registration data indicative of the registered service node and corresponding service initiation trigger in association with the subscriber, said registration data being for use in processing service initiation request messages sent from said serving node in respect of the subscriber, the apparatus being arranged to store registration data for a plurality of service registration request messages each identifying a different service node and the same subscriber, wherein the apparatus is arranged to define an order of precedence between said different service nodes after said registration data have been received.

Thus with embodiments of this aspect of the invention, interactions between service nodes are resolved after registration has been completed by means of data defining an order of preference between the nodes. As a result and in comparison with known systems, registration requests are not refused on the grounds of overlapping criteria (illegal or unsupported requests can still be rejected) but are instead noted and applications are subsequently invoked in accordance with the preference data. A significant advantage associated with this aspect of the invention is that, because registration requests are not refused, all of those applications for which a subscriber has subscribed for service can, at the time of receipt of a corresponding service initiation request message, be activated. It will be appreciated that the preference data take account of any potential conflicts between services.

In one arrangement the apparatus is arranged to store said registration data if the registration request message is received from a service node identified as accessible to the subscriber, thereby providing a means of verifying, or otherwise, that the subscriber indeed has access to the requesting service node.

In addition, in response to receipt of a second and subsequent registration request messages the apparatus can be arranged to retrieve interaction data specifying subsequent real-time interactions between corresponding two or more service nodes and to store said interaction data. The interaction data define said order of precedence between said different service nodes. Subsequently, and in response to receiving a first service initiation request message, the apparatus can transmit second service initiation request messages to two or more of said service nodes in a selected sequence in dependence on the preference data, and including events that are dependent on responses from one or more said service nodes. Conveniently the apparatus can be arranged to process a service node response message from a first service node before transmitting a second service initiation request message to a second service node during the same network event.

Alternatively, the apparatus can be arranged to retrieve interaction data specifying interactions between corresponding two or more service nodes in response to receipt of service initiation request message before proceeding in the manner described above.

Conveniently the apparatus is in operative association with a function configured in accordance with aspects of the invention described above.

Further features and advantages of the invention will become apparent from the following description of preferred embodiments of the invention, given by way of example only, which is made with reference to the accompanying drawings.

Figure 1:
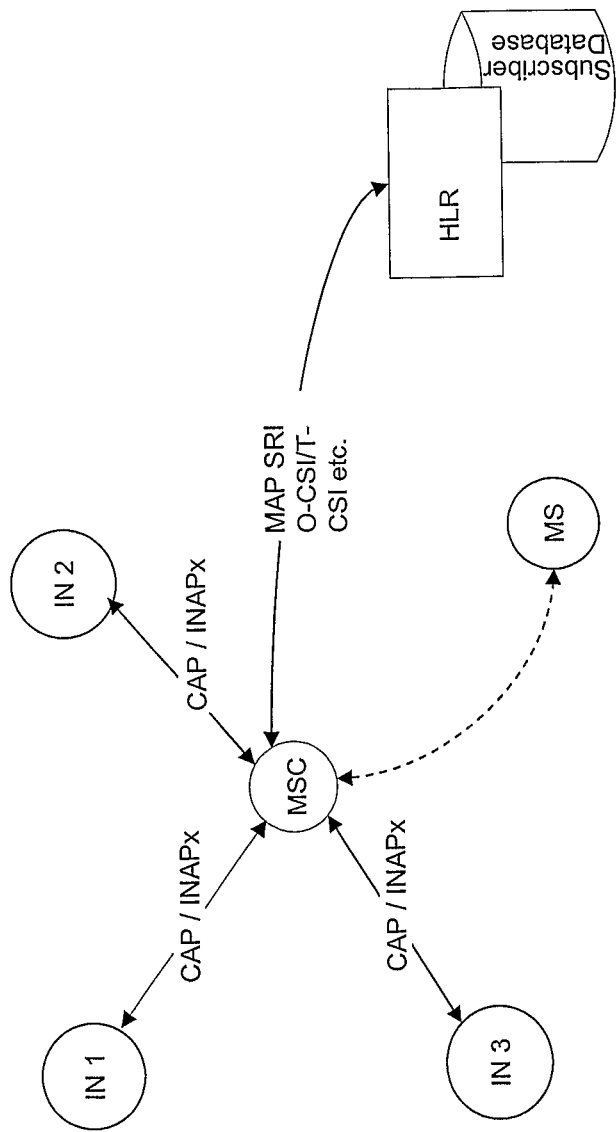
FIG. 1 is a schematic diagram showing operation of a conventional mobile network arranged to deliver network services to a subscriber.

It is to be noted that parts and steps that are presented for the first time in relation to a given Figure and that are identical or equivalent to parts and steps occurring in subsequent Figures will be described with the same reference numeral in such subsequent Figures, and will not be described in any further detail in the subsequent Figures.

DETAILED DESCRIPTION OF THE INVENTION

Embodiments of the invention are concerned with aspects of service networks, in particular with efficiently brokering the various and potentially conflicting network services available to a subscriber, and provides an event processing system and apparatus arranged to deliver this functionality. These services include specifically but not exclusively: voicemail (International Seamless Voice Application, or ISVA); Virtual Private Network number translation services (iVPN); and Selective Home Routing (SHR) services, pre-pay charging messages, post paid messages, Push to Talk services (based on B# resolution), late call forwarding, temporary call/resource interactions, services involving SMS and MMS messaging and SIP session initiation services among others. A particular feature of embodiments of the invention is the ability to control operation of IN and OSA services, and between different OSA services, in addition to brokering between different IN services. Embodiments of the invention are also concerned with brokering between non-Intelligent Network services and non-OSA services (e.g. involving SMS and MMS messaging and SIP session initiation services).

Network Environment

Figure 2:
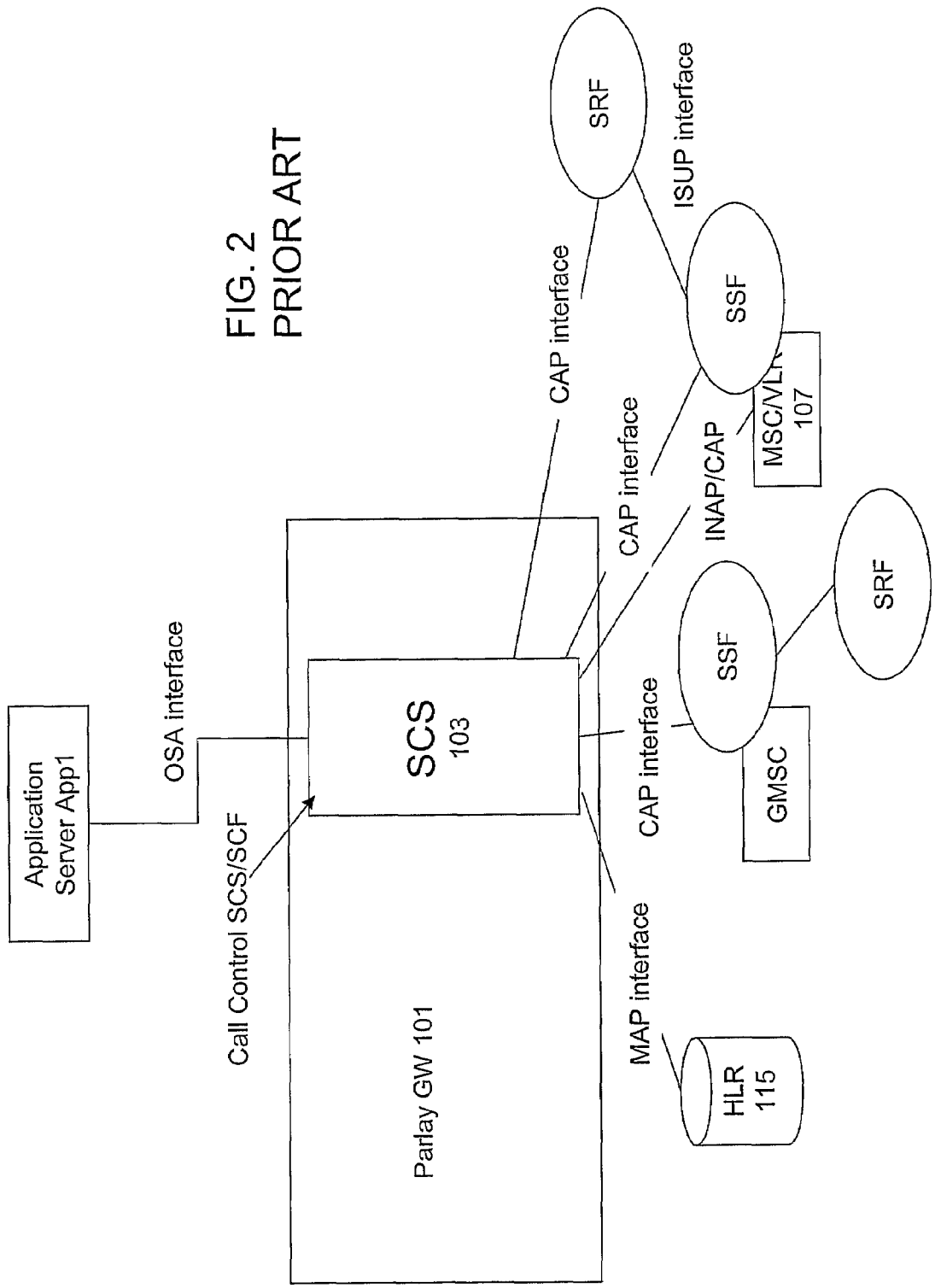
FIG. 2 is a schematic diagram showing a network having access to an OSA domain, the OSA API interface and the protocol on which the API class methods are mapped to various network protocols.
Figure 3:
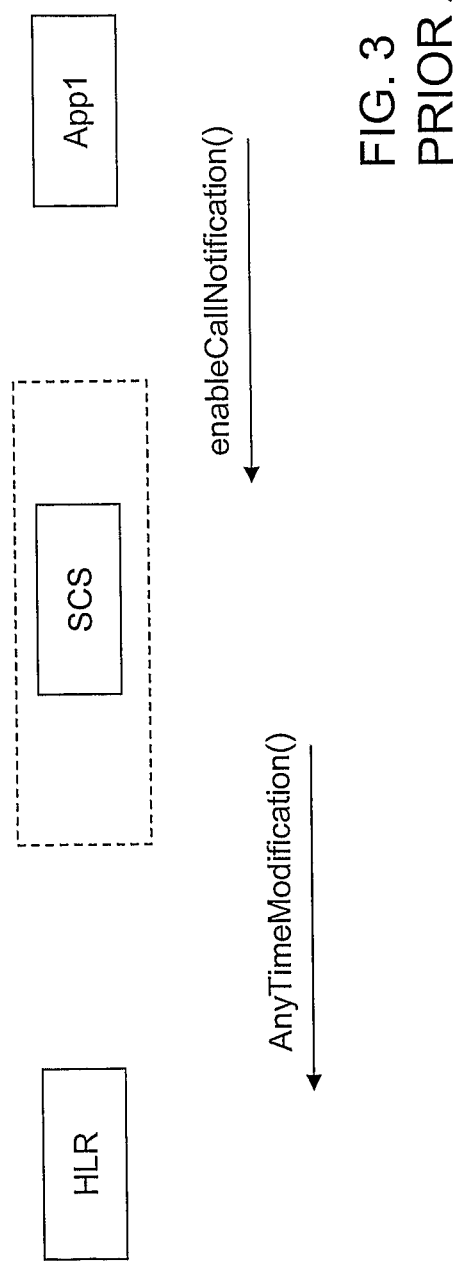
FIG. 3 is a schematic diagram showing an example of messaging flows between the OSA domain and the network domain.

Referring to FIG. 2, access to network functionality, including functionality of the Intelligent Network, is offered and controlled by different Service Capability Servers (SCSs), which appear as service capability features in the OSA interface. This OSA interface is commonly referred to as Parlay/OSA GW 101. OSA applications such as App1 communicate with the OSA GW 101 via OSA interfaces, while the underlying core network functions (Intelligent Network capabilities, MSC 107 (Mobile Switching Centre) and HLR 115 (Home Location Register)) use their specific protocols such as CAP (CAMEL Application Protocol) and MAP (Mobility Application Part) to communicate with the OSA GW 101. As described above, there are 14 SCFs, including various generic call control (GCC) and multi party call control (MPCC) SCFs, which collectively map to all of the CAP, MAP and INAP messages, and can therefore invoke all of the network capabilities.

The above-referenced core network functions are conventionally considered to be part of a Public Land Mobile Network (PLMN), which can be embodied as a cellular network such as a GSM or UMTS network, and which further comprise components concerned with the transmission and delivery of data at the radio level (not shown). In operation, the MSC 107 takes into account the impact of the allocation of radio resources and the mobile nature of the subscribers, and performs procedures required for location registration and hand-over of mobile stations. As shown in FIG. 1, the MSC 107 is connected to the HLR 115, which is arranged to store data identifying the location of mobile subscribers (e.g. in order to be able to route calls thereto); identification numbers attached to each mobile subscription (e.g. International Mobile Subscriber identity (IMSI); International Mobile Subscriber ISDN Number (MSISDN)); communication service subscription information, service restrictions (e.g. roaming limitations); general subscriber attributes and preferences; and supplementary service information including parameters associated with these services.

In terms of communication between the various components of the network, the MSC 107 and HLR 115 send and receive data via a variety of signaling protocols, including but not limited to, Signaling System Number 113 (SS#7) mobile Application Part (MAP), while signaling between the MSC 107 and the radio components use the Base Station System Application Part (BSSAP) of SS#7.

Overview: System Architecture

Figure 4:
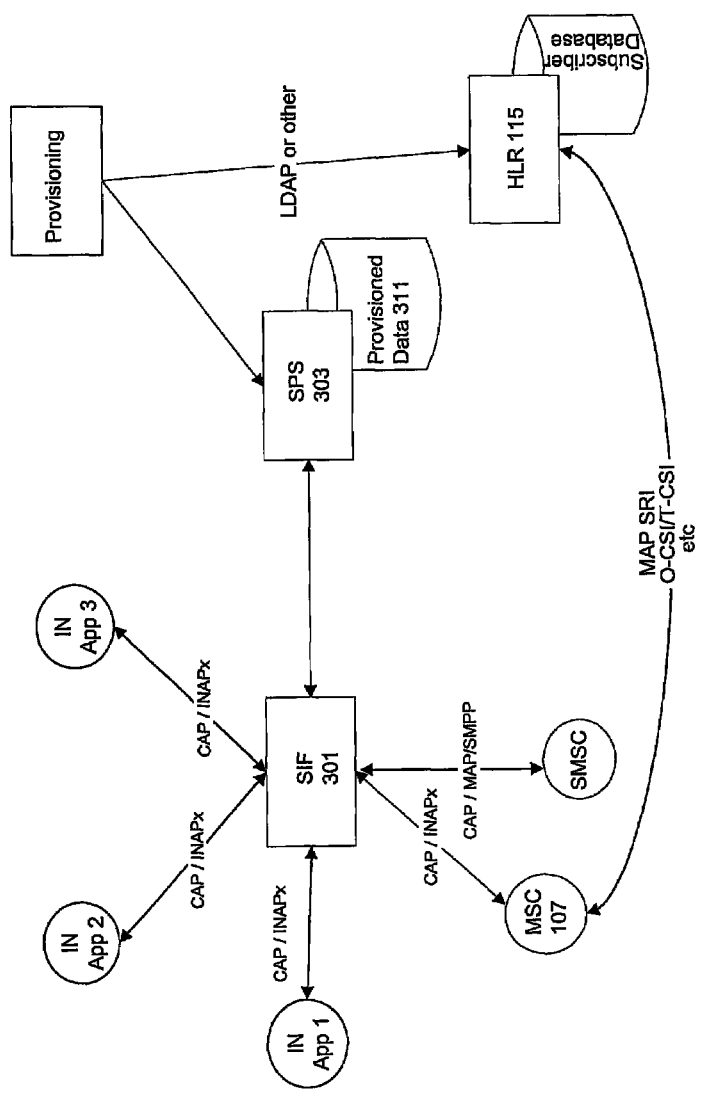
FIG. 4 is a schematic block diagram showing components of an event processing system according to an embodiment of the invention.

Turning now to FIG. 4, a first arrangement of an event processing system according to an embodiment of the invention will be described. In this first arrangement the processing system is arranged to control operation of various intelligent network services IN1, IN2, IN3 in accordance with one or more rules, and comprises a Service Interaction Function SIF 301 and a Subscriber Profile Store 303. FIG. 4 illustrates, schematically, the flow of data between the various components of the system, and it can be seen that, instead of the MSC 107 communicating directly with the Intelligent Network service nodes IN1 ... IN3, the MSC 107 interacts solely with the SIF 301, and distributes messages to various network nodes in accordance with, at least in part, data received from the SPS 303.

The SIF 301 assumes the responsibility of communicating with the various network service nodes IN1 ... IN3, and the nature and order of any communications therewith are controlled in accordance with data received from the SPS 303, as will be described in more detail below. The SPS 303 is essentially a data repository that stores subscriber-specific triggering and service related information. In addition, it can store inter-service data, which can be configured and combined by the SIF to specify interactions between service nodes (e.g. in terms of access priority). The SPS can be provisioned with data from provisioning services, such as web services located in a wider network, as is shown schematically in FIG. 4.

Figure 5:
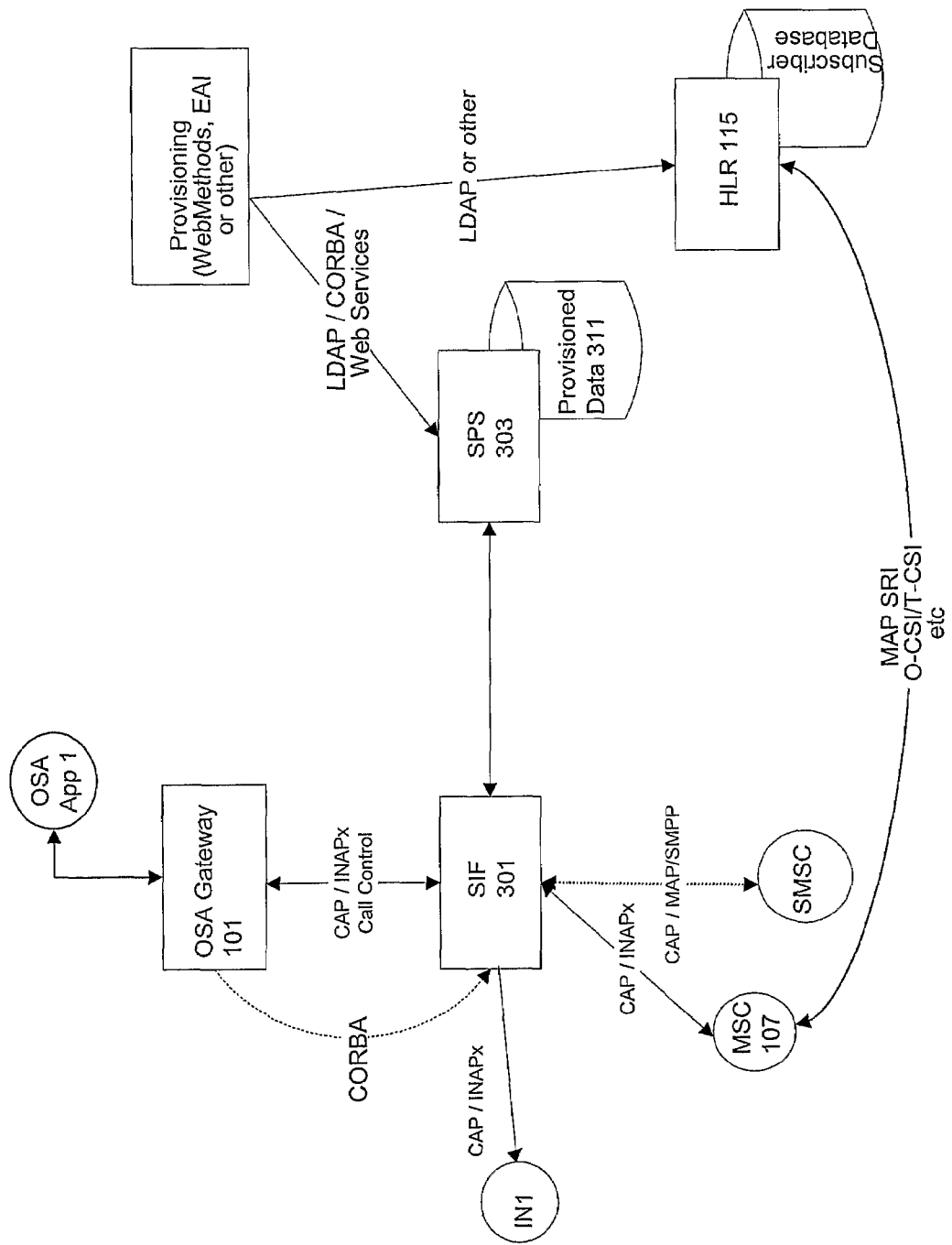
FIG. 5 is a schematic block diagram showing components of an event processing system according to a second arrangement of an embodiment of the invention.

Turning now to FIG. 5, it can be seen that the SIF 301 is also arranged to interact with, and control operation of, various OSA applications, via an OSA Gateway 101 (only one is shown for clarity). In such arrangements the service related information stored in the SPS 303 includes rules and conditions in relation to the interaction between IN services and OSA services, as will be described in more detail later in the description.

Figure 6:
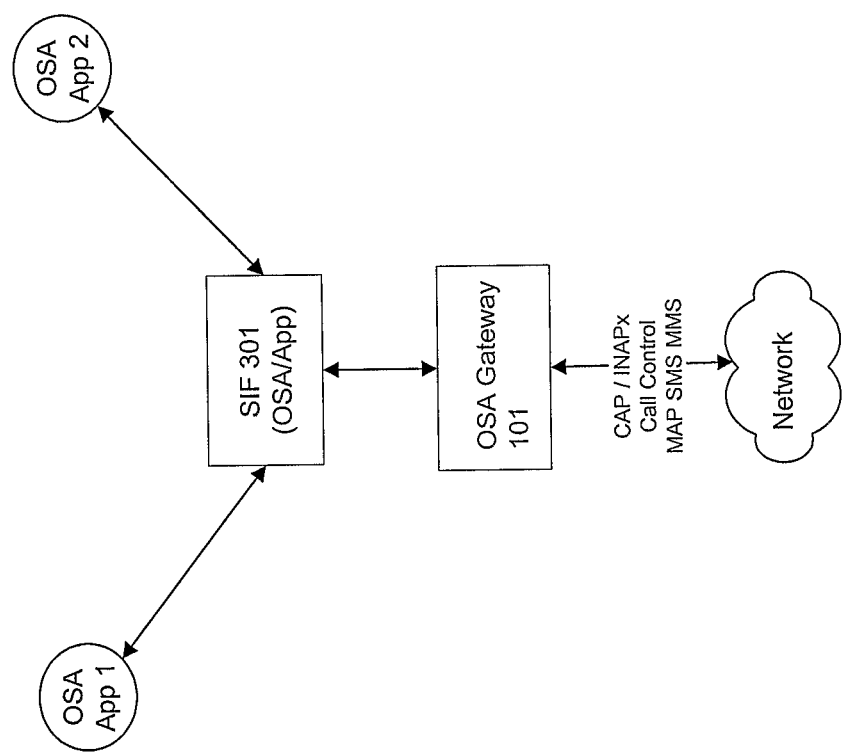
FIG. 6 is a schematic block diagram showing components of an event processing system according to a third arrangement of an embodiment of the invention.

A third arrangement is shown in FIG. 6, in which a SIF 301 is arranged to control operation of services located behind the Gateway 101. This arrangement addresses a limitation of conventional OSA Gateway design, namely of any given trigger/subscriber being effectively hard-wired to a single OSA application (and thus effectively having the same lack of flexibility as described above in the context of Intelligent Network services provided by a switch MSC). This arrangement therefore provides a means for multiple OSA applications to be invoked, flexibly, in response to certain service triggers and/or subscriber data. An event processing system could include two SIF apparatus, one located in the network, as per the first and second arrangements (FIGS. 4, 5) and one in the OSA domain (FIG. 6), meaning that the two SIF apparatus would be both logically and physically distinct from one another. Alternatively the event processing system could comprise a single SIF, which is physically distributed, but logically integrated, between the network and OSA domain. These various arrangements will be discussed in more detail below.

Service Registration

The Subscriber Profile Store SPS 303 is arranged to store a list of services (IN and OSA) and the relationships there between, in terms of network event processing, for all subscribers. The services are preferably keyed in accordance with subscriber identities and service triggers, so that, for any given subscriber identity and trigger, the services available to the subscriber can be selected when a call involving a certain trigger is due to be processed. In addition, the relationship(s) between the selected services can be retrieved, in the form of "call model logic" associated with the trigger.

As can be seen from FIGS. 4 and 5, the SPS 303 can be provisioned with data 311 from provisioning services, such as web services located in a wider network, and the provisioning process is preferably independent of the registration process. The following sets out a possible data structure for the data 311, referred to herein as provisioned data, stored in the SPS 303 in respect of a given subscriber:

---

Subscriber - MSISDN key or IMSI or Corporate Id
Attributes: - DP
        Application
           GT
           Service Key
           Protocol
           Execution precedence
           Synchronous or Asynchronous execution
           Connect precedence; forward DRA / modified calling PN in
           InitialDP
           Forwarding precedence
           Release precedence
           Error precedence
           Onnet/offnet/any
           is Hunting application
           is home routing application
Attributes: - EventId
        ServiceSet: reference to a particular set of
        applications and application
        rules specified in another SPS table.
    Timeouts
  Location [rw]

---

These attributes include data that enable the SIF 301, when suitably configured, to interwork services on the basis of individual responses and messages received from the network and other services. The SPS 303 can store inter-application and inter-service rules, which specify interactions between service nodes when the various responses and messages are received from the network (e.g. in terms of access priority); these aspects are described in more detail below. In terms of triggers, by way of example only, the SPS 303 can be configured to support the following non-limiting list of service triggers: INAP DP1-DP18; CAP V1 O-CSI, T-CSI; MAP non-DP events, e.g. locationUpdate, forwardSM; CAP V2 V3 V4 triggers; MMS, SMS, SS, USSD, SIP.

As described above in the Background section, the starting point for capturing network events of interest to OSA applications is conventionally within the Event Processing SCS, which checks the parameters specified in an enableCallNotification( ) message (or createNotification( ) message for MPCC calls) in order to identify whether or not an application has already registered for those parameters. On the basis of this check, the SCS allows or rejects registration of the application for those parameters.

By contrast, the starting point for embodiments of the invention is unconditional registration of a requesting application, which means that, contrary to known methods, the parameters included in a registration request are not checked against previously registered applications. Of course the potential conflicts that were previously managed in a somewhat heavy-handed manner at registration still need to be handled and embodiments of the invention provide an alternative and flexible means of conflict management, at a different place in an event processing cycle. This will be described in more detail below, but first aspects of the registration process for OSA applications will be described with reference to FIGS. 7-13.

Figure 7:
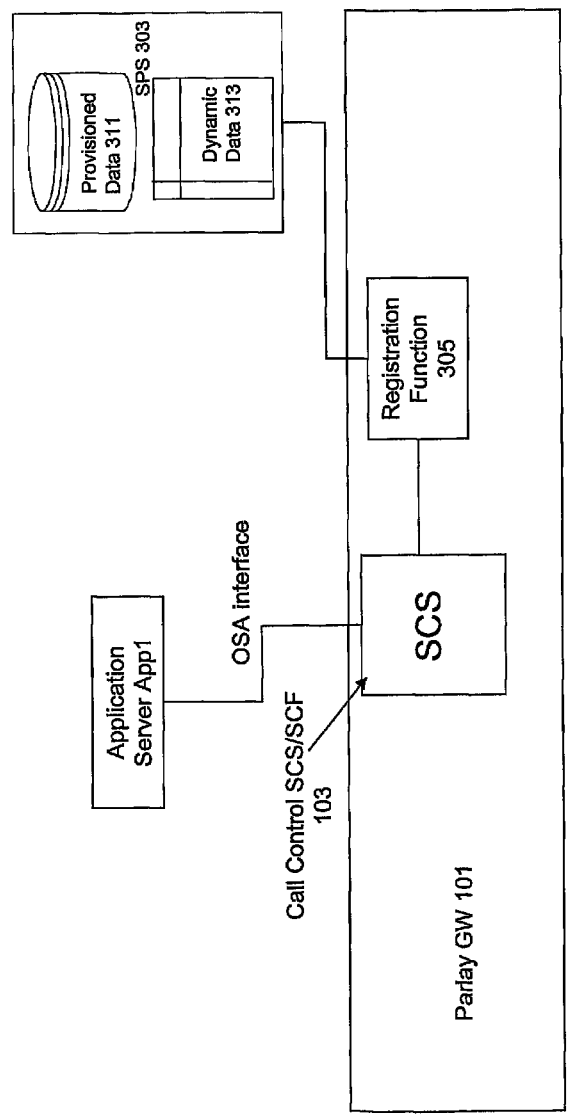
FIG. 7 is a schematic block diagram showing registration components of an OSA gateway according to an embodiment of registration aspects of the invention.

Turning firstly to FIG. 7, it can be seen that the Parlay GW 101 includes a registration function 305 configured to communicate both with the Call Control SCS 103 and with a store SPS 303. In addition to the provisioned data 311, introduced above (subscriber-specific triggering and service related information), the SPS 303 stores dynamic data 313, which indicate the real-time status of any given application listed in the provisioned data 311. Examples of such real-time status information include data identifying whether or not an application is active, together with details of subscribers and network events currently registered in respect of the application; in the following description these real-time data are alternatively referred to as "application handles". The applications are preferably keyed in accordance with subscriber identities and service triggers, so that, for any given subscriber identity and trigger, the applications available to the subscriber can be selected when a call involving a certain trigger is due to be processed.

Figure 8:
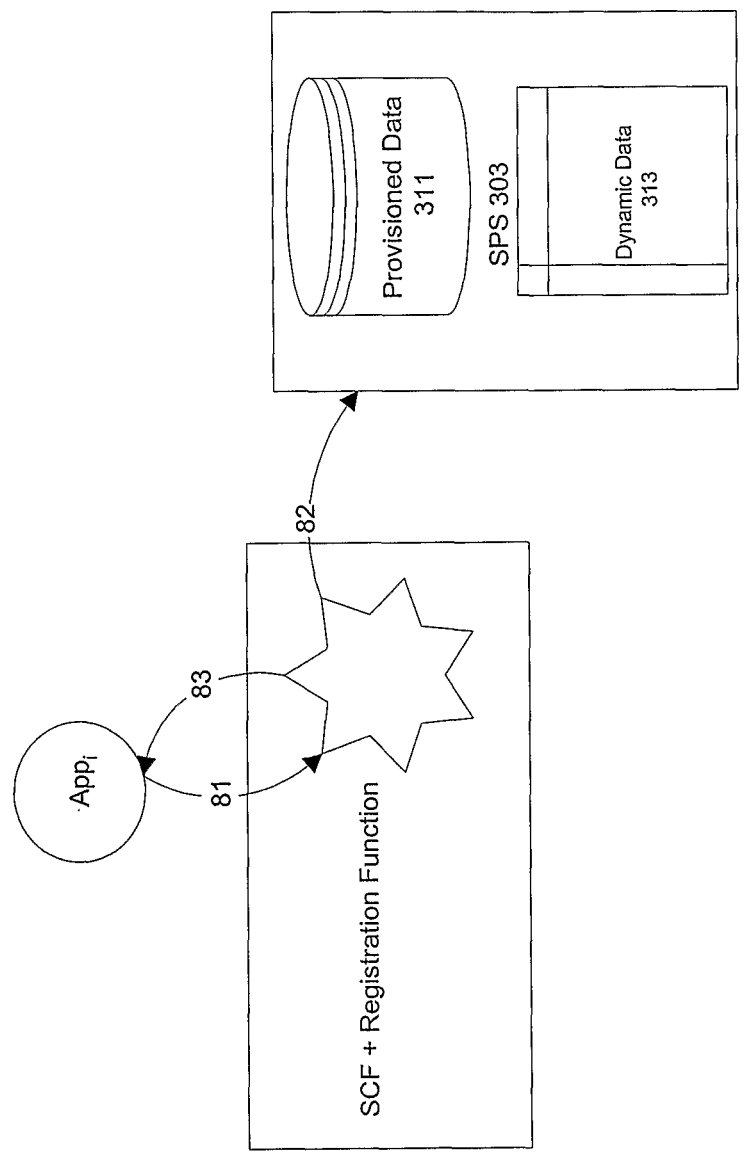
FIG. 8 is a schematic diagram showing an example of a registration process according to a first registration embodiment.
Figure 9:
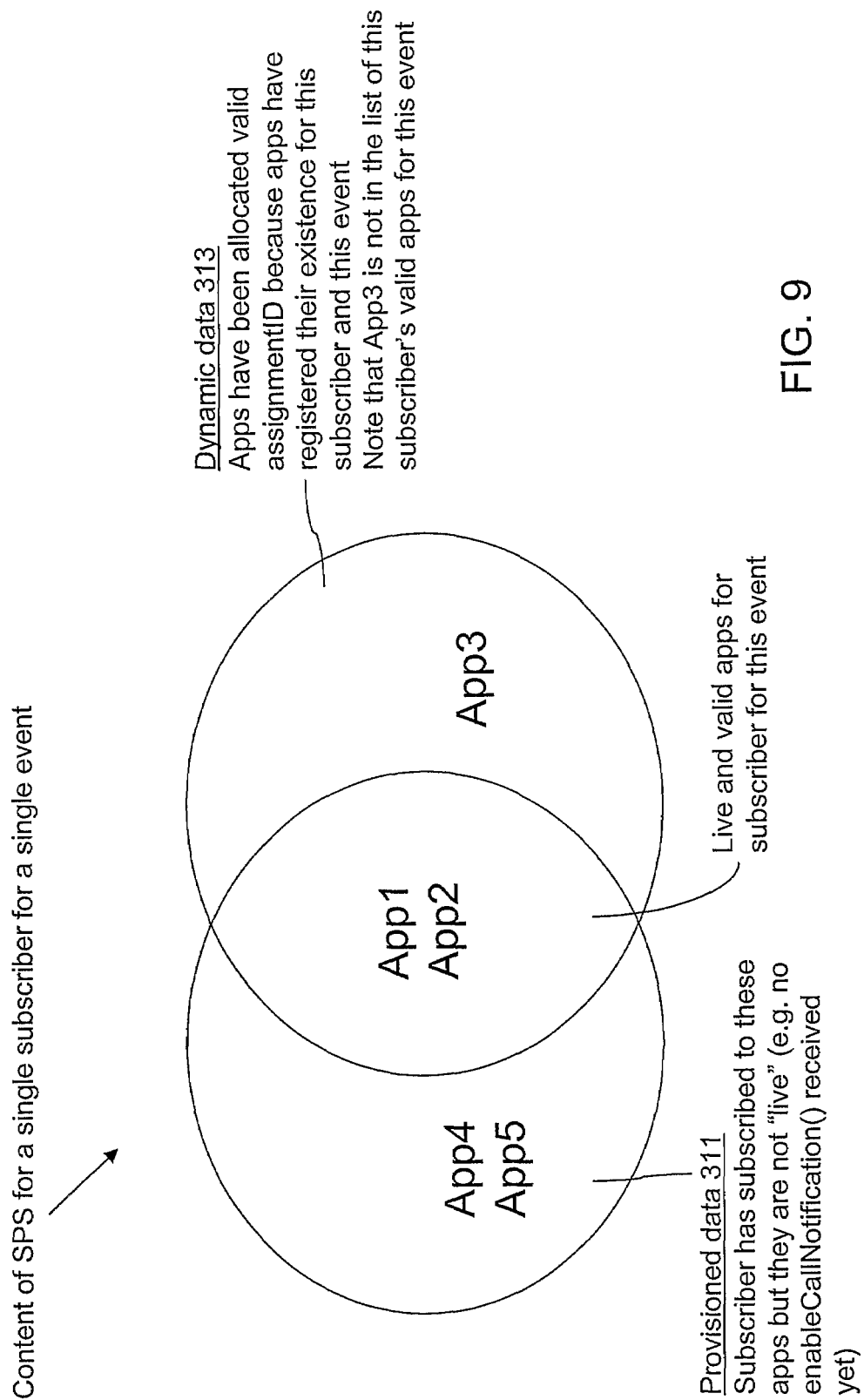
FIG. 9 is a schematic diagram showing contents of the Service Provisioning System of FIG. 5 according to the first registration embodiment shown in FIG. 8.

FIG. 8 shows the steps involved in a registration process according to a first embodiment: at step 81 App1 sends a GCC enableCallNotification( ) request to the SCS 103, which causes the registration function 305 to assign an assignmentId in respect of App1. At step 82 the assignmentId is sent to the SPS 303, together with the trigger, source and destination address data specified in the enableCallNotification( ) request, and an acknowledgement message is subsequently transmitted back to App1 at step 83. Upon receipt of a message from the registration function 305 at step 82, the SPS updates the dynamic store 313, either to include App1 (and details of the trigger, source and destination address received at step 81) or, if App1 is already stored therein in relation to other trigger/subscriber parameters, to update the parameters so as to include those corresponding to the data received at step 81. FIG. 9 is a schematic diagram showing how data are distributed amongst components of the SPS 303: the circle corresponding to the dynamic data 313 represents applications in respect of which data have been received from the registration function 305 in the manner described above (as shown in FIG. 8), whereas the circle corresponding to the provisioned data 311 represents applications in respect of which the subscriber has subscribed, but which have not yet registered with the gateway 101. It will be appreciated that in this, and subsequent embodiments, that the registration request can relate equally to a plurality of subscribers (eg bulk registration) as to a single subscriber.

Figure 10:
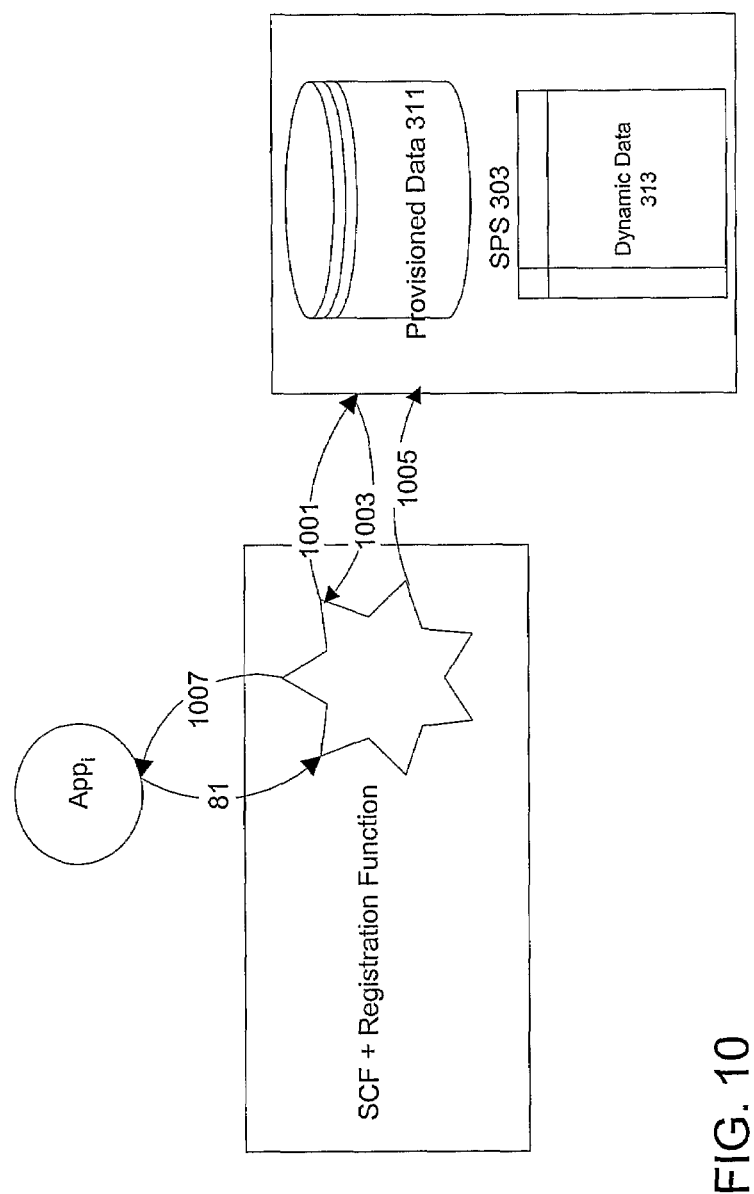
FIG. 10 is a schematic diagram showing an example of a registration process according to a second registration embodiment.
Figure 11:
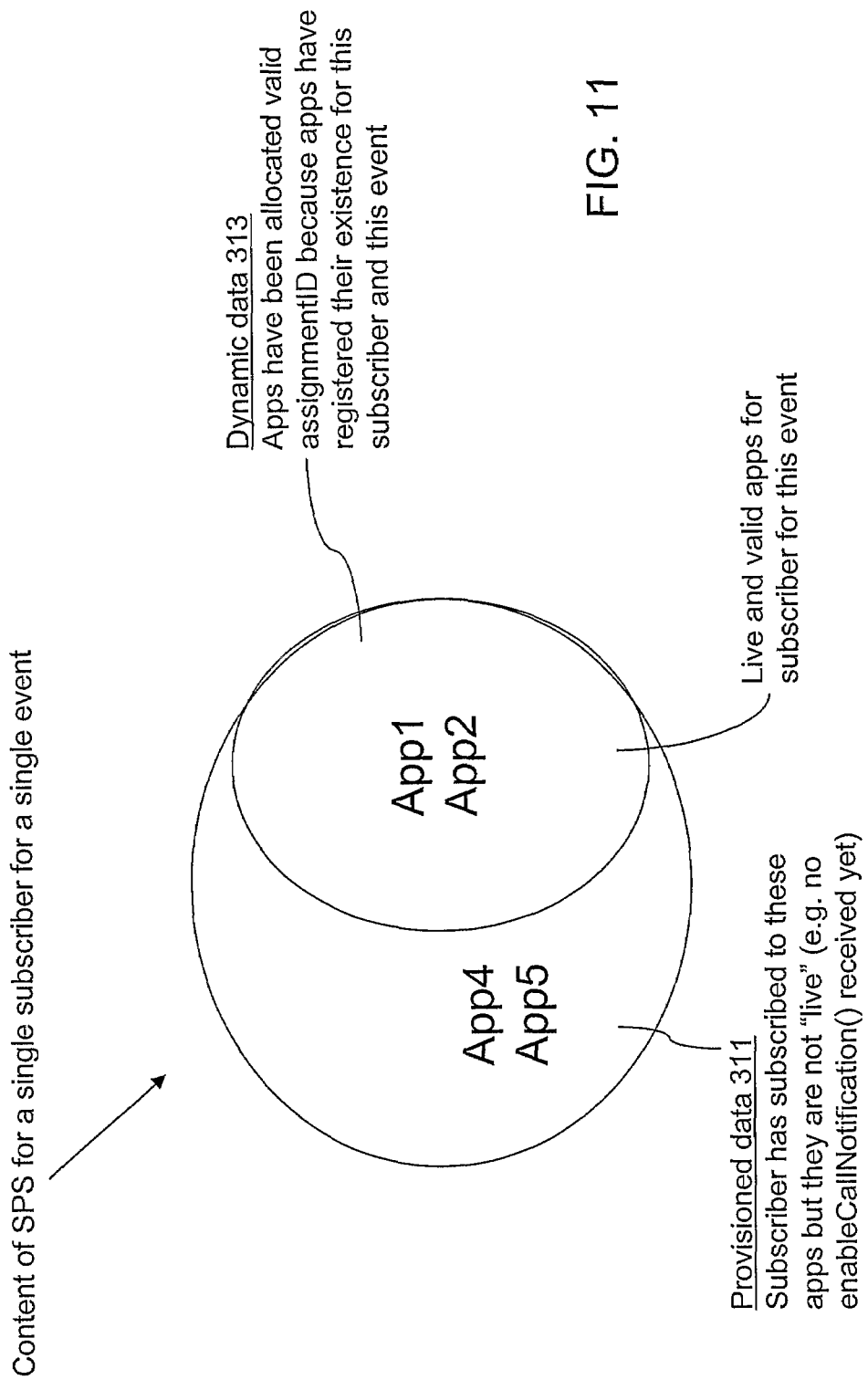
FIG. 11 is a schematic diagram showing contents of the Service Provisioning System of FIG. 5 according to the second registration embodiment shown in FIG. 10.
Figure 12:
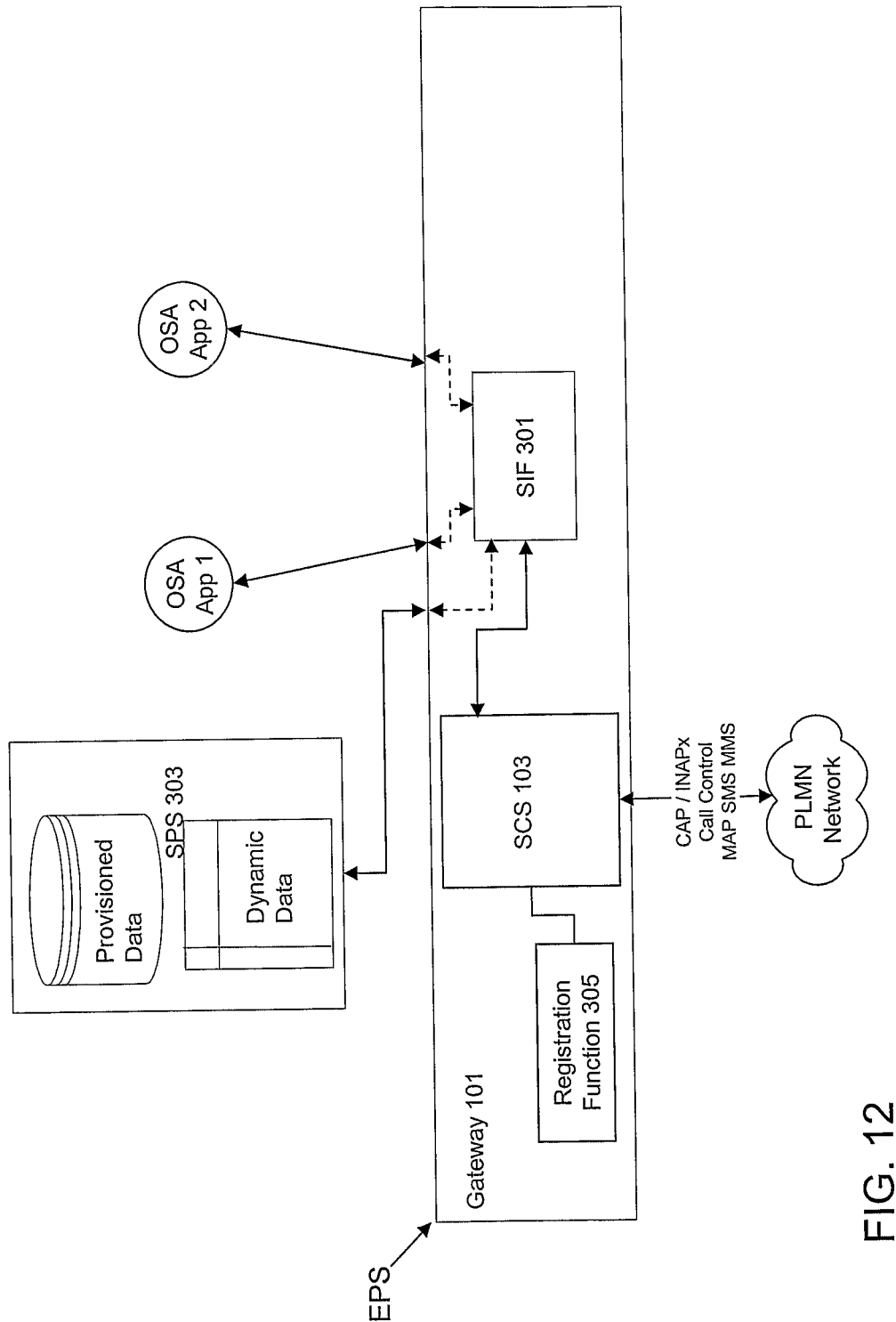
FIG. 12 is a schematic block diagram showing components of an event processing system according to a further embodiment of the invention.

FIG. 10 shows the steps involved in a registration process according to a second embodiment: at step 81 App1 sends an enableCallNotification( ) request to the SCS 103, which causes the registration function 305 to send a request to the SPS 303 in respect of App1, querying the SPS 303 for the subscriber/trigger/App1 combination embodied in the request received at step 81 (step 1001). This causes the SPS 303 to consult the store of provisioned data 311 and at step 1003 the SPS 303 returns a result of the query to the registration function 305. Assuming the result to be positive, the registration function 305 allocates an assignmentId to App1 and at step 1005 sends the allocated assignmentId to the SPS 303, together with the trigger, source and destination address data specified in the enableCallNotification( ) request. An acknowledgement message is subsequently transmitted back to App1 at step 1007. Upon receipt of a message from the registration function 305 at step 1005, the SPS updates the dynamic store 313, either to include App1 (and details of the trigger, source and destination address received at step 81) or, if App1 is already stored therein with other trigger/subscriber parameters, to update the parameters so as to include those corresponding to the data received at step 81. FIG. 11 is a schematic diagram showing how data are distributed amongst components of the SPS 303: the circle corresponding to the dynamic data 313 represents applications in respect of which data have been received from the registration function 305 in the manner described above (as shown in FIG. 10), whereas the circle corresponding to the provisioned data 311 represents applications in respect of which the subscriber has subscribed, but which have not yet registered with the gateway 301.

From a comparison of FIGS. 9 and 11 it can be seen that the difference between the two registration processes is that, in the first registration method, the dynamic data store 313 can hold application data which is actually invalid for this particular subscriber/trigger event, whereas in the second registration method the dynamic store 313 will only ever hold a subset of applications for which the subscriber has bona fide access. Whilst in the first arrangement this means that the dynamic data store 313 can hold invalid data, it is a somewhat quicker procedure than the second (involving 2 fewer steps than are required in the second process); however, the second registration process is safer than the first. A particular advantage of registering applications in accordance with the second embodiment is that the registration process is transparent to the registering application, which means that it can conveniently be integrated with any OSA standard-compatible arrangements.

A further process is also possible (not shown), in which the SPS holds data specifying all possible combinations of applications, together with interaction conditions associated therewith. These data are populated off-line, so that, during the registration process, the SPS serves as a kind of look-up function for pertinent inter-application rules. When the registration function 305 receives (via the SCS 103) an application registration request (step 81), the registration function 305 assigns an assignmentId to the application App1 and sends the assigned identifier to the SPS 303 (step 82). In response to receipt of the identifier, the SPS 303 retrieves interaction rules on the basis of this, and any other applications that have registered for this subscriber, and associates the retrieved interaction rules with the trigger, source and destination address received at step 81. In addition the SPS updates the dynamic store 313, either to include App1 (and details of the trigger, source and destination address received at step 81) or, if App1 is already stored therein in association with other trigger/subscriber parameters, to update the parameters so as to include those corresponding to the data received at step 81. Operation of the SPS according to this embodiment can be explained with reference to an example:

The SPS 303 is arranged to store the interaction rules as indicated below:

| Application(s) | Rule(s) |
|---|---|
| Single App (e.g. X) | None |
| X & Y | Beta |
| X & Z | Delta |
| Z & Y | Gamma |
| X & Y & Z | Alpha |

Assuming a subscriber record for whom an application request has been received from Application X only, then in response to a subsequent registration request from Application Y, the SPS 303 retrieves an interaction rule for a combination of applications X & Y (here beta), and marks the retrieved interaction rule against the subscriber and trigger, in addition to updating the dynamic data store 313 to reflect registration of application Y for this subscriber and trigger data received at step 81. If, subsequently, application Z registers for this subscriber, the SPS 303 locates an interaction rule for a combination of applications X, Y and Z (alpha) and updates both the SPS 303 and dynamic data store 313 accordingly. If application X then deregisters (either per se or in relation to this subscriber) the SPS 303 retrieves interaction rule gamma and updates the stores information accordingly. These interaction rules specify valid interactions between two or more applications when an event relating to an associated trigger is received from the network. It is to be noted that these interactions can be conditional upon the response and/or message type received from services (applications) associated with the services; this behaviour can conveniently be specified in the interaction rules, or can be specified in data associated with the services concerned.

It is to be noted that this arrangement is considerably different to that presented by BT (described as "Feature interaction/Service Selection"). In the BT method and system, interaction rules are consulted at the time of application registration in order to determine whether or not applications can co-exist in relation to the same trigger. If the interaction rules permit a requesting application to co-exist with an application that has already registered in respect of the associated subscriber/trigger, details of this requesting application are recorded in a user profile. When a corresponding network trigger is subsequently received the applications are invoked sequentially, in an order determined by the order in which the applications are listed in the user profile (which is determined by the order in which the applications registered with the gateway). By contrast, with embodiments of the present invention, it is the potential interaction(s) between applications that is/are selected during the registration process, the actual and permissible inter-application relationships and consequent behaviours having been resolved off-line. As a result, the order in which applications are invoked is not constrained by, or indeed even connected to, the order in which applications register with the gateway. Instead, invocation of applications is specified in the preconfigured rules, which can be optimised as a function of the applications themselves. This is a clear advantage over the BT design.

As described above, in addition to storing data indicative of available applications, together with associated real-time status information assigned during the registration phase, the SPS 303 is arranged to store data indicative of the relationships between services and applications, in terms of how an incoming network event should be processed; these data are stored in the form of "call model logic" associated with network events (or triggers). From the foregoing it will be appreciated that such interaction rules, or call model logic, are selected at the time of application registration in the case of the third registration method. When registration of applications is effected in accordance with the first and second methods the associated interaction rules are selected from the repository of interaction rules when an event is received from the network, as will be described in more detail below.

Figure 13:
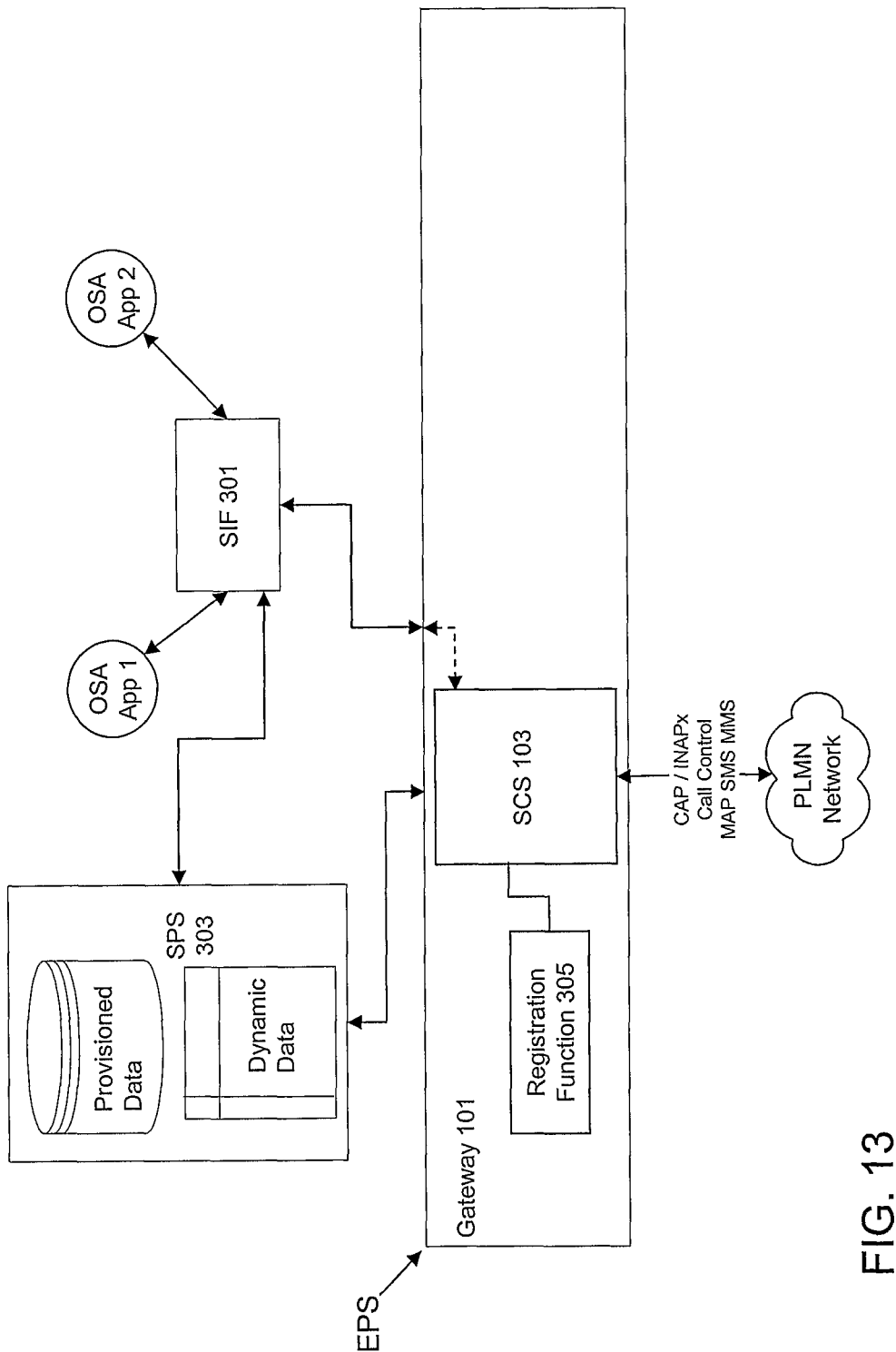
FIG. 13 is a schematic block diagram showing, in more detail, components of an event processing system shown in FIG. 6.

It will be appreciated from the foregoing that in the case both of OSA and IN applications, the issue of conflicts between applications is completely ignored in the registration phase. Instead, inter-application management is controlled by the SIF 301 when a request for service is received from the network. In terms of the configuration of these components, referring to FIG. 12, in a first arrangement the SIF 301 is located within the gateway 101, and assumes the responsibility of communicating with the various network application server nodes App1 . . . . Appn. An alternative arrangement is shown in FIG. 13, in which the SIF 301 is located outside of the Gateway 101, and thus communicates directly with the OSA applications App1, App2 and the SPS 303, whilst communicating with the gateway 101 via an interface. In both Figures the dotted lines indicate communications with gateway interfaces in order to communicate with external devices such as, in the case of FIG. 12, the SPS 303 and applications App1, App2 and, in the case of FIG. 13, the SCS 101).

Service Invocation

Figure 14:
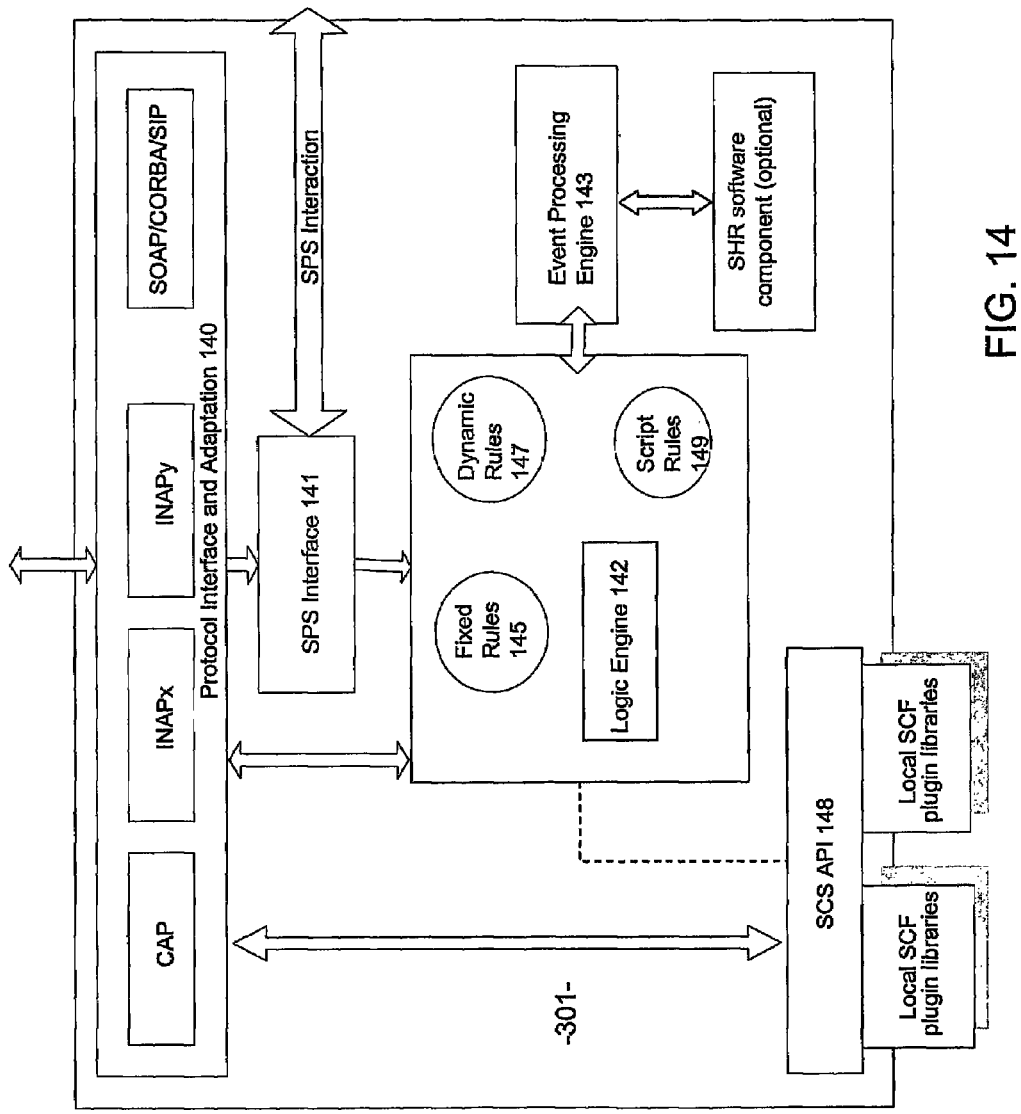
FIG. 14 is a schematic block diagram showing, in more detail, a service interaction component of the event processing system shown in FIGS. 4, 5, 6, 12 and 13.

The components of the SIF 301 and functionality provided thereby will now be described with reference to FIG. 14, which is a block diagram showing a breakdown of the SIF 301 in its component parts. Preferably these components are implemented as one or a plurality of software components, and distributed on one or a suite of computer devices, which comprise standard CPU, memory, data bus, Input/Output ports, data storage, and operating system programs (not shown).

Generally speaking, the SIF 301 is arranged to provide an inter-IN to IN and/or IN to OSA and/or inter OSA to OSA application mediation such that multiple service applications can share trigger points such as the Intelligent Network Application Protocol (INAP) and Camel Application Protocol (CAP) detection point events listed above. In one arrangement the SIF is configured to receive, from the MSC 107 or from any SCF such as one including SCS 103 shown in FIG. 2, a service request message including some sort of trigger; perform a query upon the SPS database 303 in dependence on the received trigger; receive data from the SPS 303 in response to the query; invoke and co-ordinate whichever service applications are identified by the data returned by the SPS 303 according to the call model logic associated therewith (returned by the SPS 303); and collate an overall response to send back to the SCS 103 or MSC 107 to enable service to continue. The call model logic includes actioning services in dependence on responses and messages received from other services during call set up; the logic is sufficiently flexible and fine grained that, for a given network event, the MSC 107 and other network switching devices could be involved in event set up, and any given service application can be invoked more than once.

In the present embodiment the SIF 301 comprises a services interface 140 for communicating with the network service applications IN1 . . . INx, App1 . . . . Appn and switch devices such as MSC 107; an SPS interface 141 for communicating with the SPS 303, a logic engine 142 and an event processing engine 143. The services interface 140 is arranged to support at least CAP, INAP, MAP, SIP and APIs such as CORBA and SOAP, thereby enabling the SIF 301 to communicate with a range of disparate network devices.

The logic engine 142 is arranged to request service data from the SPS 303, together with data identifying rules and details of service applications (in the form of fixed rules 145, dynamic rules 147 and/or scripted rules 149 (at least some of which are received from the SPS 303 in real-time)), in dependence on the trigger and subscriber data. Having received these data, the logic engine 142 is arranged to generate one or more network processing events, which involve invoking a service via the services interface 140 and causing the event processing engine 143 to monitor for, and act upon, output from such invoked services. In particular, the event processing engine 143 is arranged to perform transaction management, correlation management (e.g. correlate DP received from different switches), timeout control (in relation to responses received from services IN1 . . . INx, App1 . . . . Appn and the SPS 303); instance management (in relation to sequencing of services, and support for multiple simultaneous independent operations); and general administrative tasks such as statistics and alarm management. The event processing engine 143 can therefore effect one or more network services and OSA applications in response to an OSA callEventNotify( ) message and/or an IN InitialDP, collate overall responses from some or all of the actioned services and send data to the SCS 103 or MSC 107 so as to connect a subscriber to the requisite network service(s).

The features and functionality of the network event processing engine 143 will now be described in more detail. The call model logic returned from the SPS 303 (typically in the form of data 145, 147) is effectively used to control the sequence in which IN and OSA service applications IN1 . . . INx, App1 . . . . Appn are invoked with initial and subsequent messages, thereby resolving the problem of distributing the single trigger resulting from a trigger point. Where the output of one service application influences operation of another service application, invocation is preferably synchronous, but if the output from various service applications is simply combined by the event processing engine 143, the service applications are preferably invoked asynchronously so as to improve latency. It can therefore be seen that inter-application processing is managed at the time of processing a call by means of the rules retrieved from the SPS 303. In addition to the SPS 303 returning sequencing rules in respect of OSA triggers such as callEventNotify( ) and IN triggers such as InitialDP triggers, there are rules for processing event notifications (ERB (IN), RouteRes( ) (OSA)) applyCharging (AC/ACR (IN), superviseCallReq( )/superviseCallRes( ) (OSA)) messages, temporary call and resource access (ETC/CTR) and any resultant responses therefrom.

In short, the operation of the SIF 301 can be viewed as comprising two distinct phases: a first, in which the SIF 301 retrieves actionable data corresponding to the trigger; and a second, in which the SIF 301 invokes applications on the basis of the actionable data, the invocation including monitoring for, and acting upon, data received from the actioned applications.

The event processing engine 143 is additionally arranged to control operation of multiple service applications that generate conflicting events and actions. Taking a simple example, if multiple service applications return a CONNECT (IN) or routeRequest( ) (OSA) message, the event processing engine 143 applies various rules in order to identify which of the messages 'wins'; and in another simple example, if a CONNECT/routeRequest( ) message and a RELEASE (IN) or release( ) (OSA) message is returned by different service applications, the event processing engine 143 applies various rules to identify which of the two conflicting actions is taken. Essentially, therefore, the outputs are processed in accordance with an appropriate rule retrieved from the SPS 303 associated with the conflicting event and/or action.

The event processing engine 143 is arranged to handle communication failures, in accordance with the dynamic (i.e. configurable) rules 147 retrieved from the SPS 303, dependent on the type of failure. For example, if a first service application aborts, one option is that the whole transaction aborts, whilst another might be that if the first service application succeeds but the second fails, the response from the first should take precedence.

The event processing engine 143 is also configured to monitor for responses within a predetermined time period, wherein, in the event that a service application response fails to arrive, or MSC responses fail, the SIF 301 performs one of a plurality of actions. For example, in the case of a service application failing to respond within the specified time period, the SIF could send a TCAP failure response to the MSC 107 depending on the associated error rules. The error and timeout rules could be static rules 145 stored and maintained by the SIF 301.

In summary, the logic engine 142 and event processing engine 143 controls the following actions in accordance with conditions specified in the fixed, dynamic and static rules 145, 147, 149:
 i. The order in which service applications are invoked;
 ii. How responses from service applications are combined;
 iii. How subsequent transactions based on responses from the service applications shall be performed;
 iv. Whether the call control is managed by the SIF, or delegated to a service application; and
 v. Whether applications should be excluded from invocation as a function of the type of network (e.g. home or roaming).

A non-limiting list of examples of the fixed rules 145 will now be described:
 Requests are cumulative: if service application A requests Request Report BCSM DPx and application B requests RRB DPy then the result shall request RRB DPx and DPy. (A Request Report BCSM is referred to herein as RRB and is a request to create trigger points for later in the communications flow—e.g. Busy, Disconnect, Answer, No answer. If these points are triggered, an event report BCSM (ERB) is automatically generated);
 If there are multiple RRB requests for the same DP then only a single invocation shall be requested;
 If there are multiple RRB requests for the same DP then the monitor mode shall be the highest requested;
 CONTINUE shall only be returned if all service applications indicate continue;
 If there is only one service application listed for a subscriber/DP then the SIF shall drop out of the call, i.e. forward the InitialDP to the service application, with the response routed directly back to the initiating MSC;
 If there are no service applications defined then the SIF shall return a CONTINUE response;
 The SIF shall drop out of the flow at the earliest possible opportunity; e.g. if only CONTINUE, CONNECT or RELEASE is returned to the MSC, or if all expected MSC responses are destined for a single application; etc.

A non-limiting list of examples of the dynamic rules 147 will now be described:
 The order of Initial DP relay to service applications shall be in the configured precedence order;
 If service applications can be invoked asynchronously then they should be, since this will improve latency;

If the response is RELEASE, then the overall response shall be governed by the release precedence of the service application. If there is a service application with a higher release priority that has not returned a RELEASE (i.e. CONTINUE or CONNECT) then the RELEASE from the lower priority service application shall be ignored. If the RELEASE is from the application with the highest release priority, then the remaining service applications need not be actioned; and a RELEASE and TCAP END shall be returned;

If a CONNECT is returned, then the called/calling party returned to the MSC shall be that from the service application with the highest connect precedence;

etc.

A non-limiting list of examples of rules 149 that are preferably scripted will now be described:

Charging Reports (ACR) shall be distributed only to those applications that contributed to the AC previously generated. There may be complex calculations required to massage the ACR in to an appropriate form for each service application;

Where action is dependent on content within a message, a script can be used to identify the content within the message and invoke an appropriate action;

etc.

In addition to the fixed, dynamic and static rules 145, 147, 149 described above, the SIF 301 operates in accordance with several general rules, which include the following:

The SIF shall end the TCAP dialogs with TC_END when the response to the MSC is a simple CONNECT, CONTINUE or RELEASE (basic end);

The SIF shall end the transaction without a TC_END if it determines that there are no more messages expected (e.g. ACR received indicating end of call, and no later trigger points armed)—this is known as a pre arranged end, and no further messages are sent;

The SIF shall end all open dialogs if it receives a TC_ABORT from the MSC—by relaying the TC_ABORT;

The SIF shall end all open dialogs if it receives a TC_END from the MSC—by relaying the TC_END;

The SIF shall end the dialog with a TC_END if unexpected errors occur;

Following an ERB Busy Report, a Connect message to a different number shall be returned (this may invalidate all previous interactions with other applications, so a script might be used to abort some applications or modify behavior explicitly, potentially using messages generated specifically for this purpose).

It will be appreciated that in this, and other embodiments, that the protocol and/or APIs used in the rules are those appropriate to the services involved, and are not restricted to INAP, CAP, GCC, MPCC.

Figure 15:
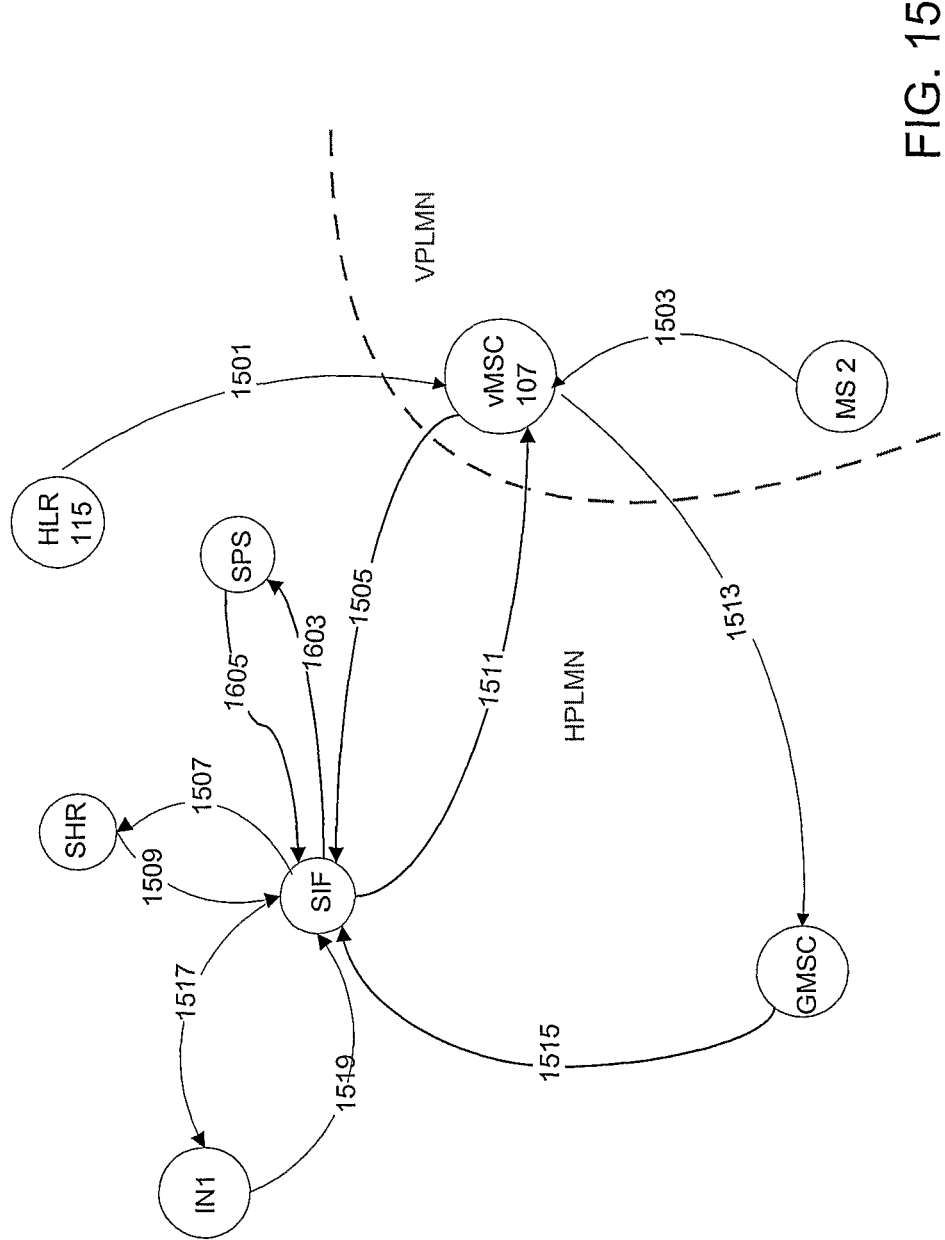
FIG. 15 is a schematic diagram showing an example of an event handling process according to an embodiment of event processing aspects of the invention.

The functionality of an event processing system will now be described with reference to several example scenarios involving processing of incoming calls from a mobile station MS 2. Referring to FIG. 15, in a first example the system is concerned with controlling the operation of various IN services, including a Service Home Routing (SHR) application for use in changing serving node when a subscriber MS 2 is roaming in a visitor network VPLMN, and an unspecified service application IN1, whose operation is dependent on the serving node being in the home network. This first example illustrates interactions between the SIF 301, a SHR application and one other and as such is a simple example; it is included to demonstrate the types of rules, conditions and messages passing to and from the SIF 301, serving node 107 and service nodes to aid understanding of other, more complex, embodiments of the invention.

In this example the SIF 301 is used to manage inputs to and from the various service applications SHR, IN1 dependent on service data relating to the subscriber MS 2 (a SHR service allows a call to be processed within the home network (HPLMN) if that resolves problems or limitations associated with processing by the visitor network (VPLMN)).

Figure 16:
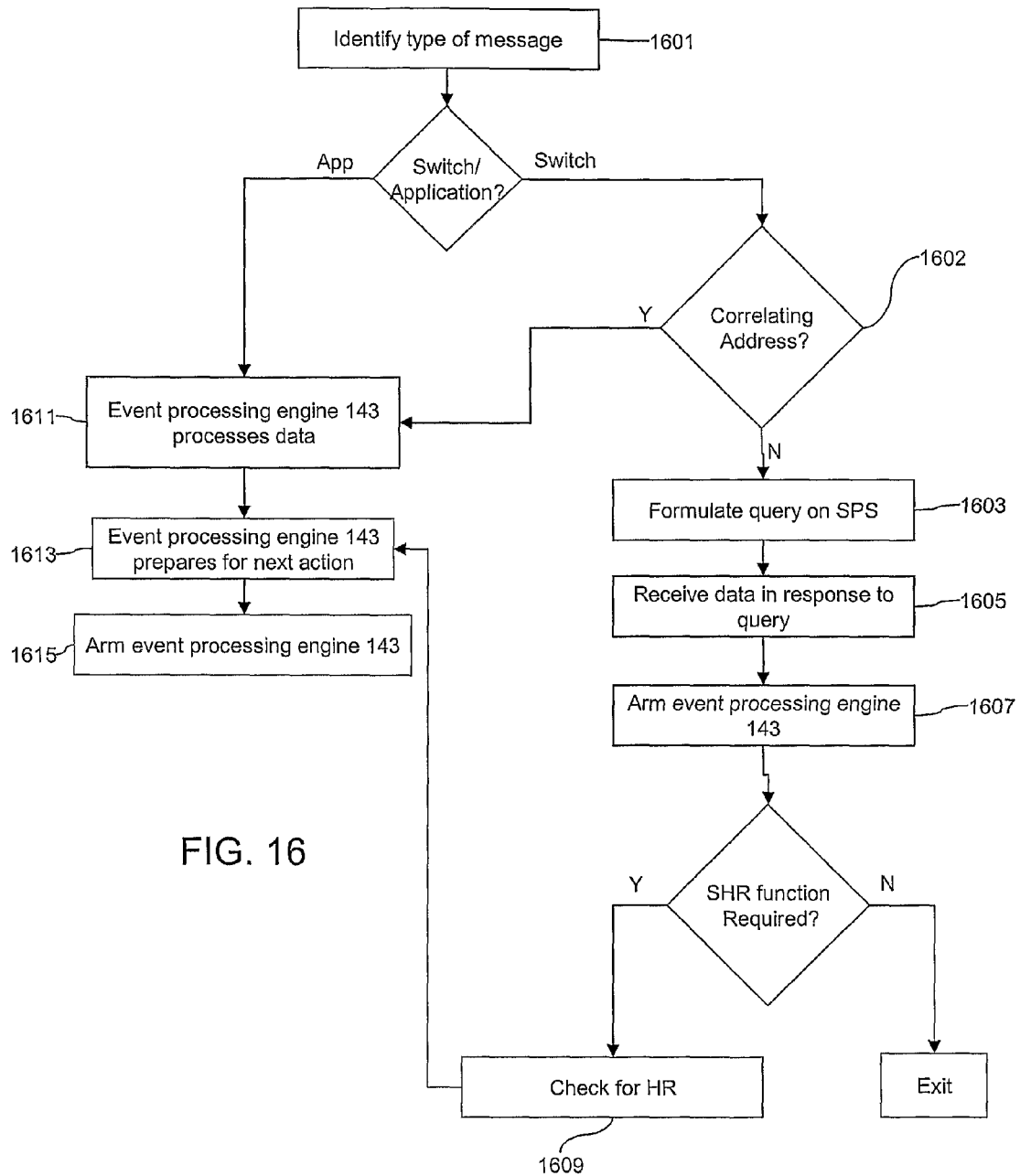
FIG. 16 is a flow diagram describing steps carried out by the service interaction component shown in FIG. 14 during the event handling process shown in FIG. 15.

FIG. 15 is a schematic diagram showing the transfer of communication between components of the system, while FIG. 16 is a block diagram showing steps carried out by the SIF 301. In the following, reference will be made to FIGS. 15 and 16 together. At step 1501, having received a Location Update request, the HLR 115 sends a signal comprising O-CSI (Originating Camel Subscriber Information) to the vMSC 107 (MSC in visitor network), which performs various authentication and setup procedures in order to authenticate the subscriber MS 2 with the network VPLMN. The information sent to the vMSC 107 at step 1501 includes the network address of the SIF 301 and the service triggers stored in respect of subscriber MS 2.

Having successfully authenticated the user, the vMSC 107 waits for the subscriber MS 2 to request access to a network service; once received (step 1503) the vMSC 107 sends (step 1505) a message to the SIF 301, including data identifying the subscriber MS 2 and specifying the type of service trigger (in this example CAP IDP DP2), together with details of the CdPN (B) and CgPN (MS 2). Turning to FIG. 16, when a message is received by the SIF 301, it firstly identifies the type of message (step 1601). In this example, the type of message is identified to be a service set-up message, and, since the IDP represents a new call, the SIF 301 formulates a query (step 1603), using e.g. the Directory Access Protocol (DAP), so as to retrieve data from the SPS 303. Having formulated and performed a suitable query, the SPS 303 returns data in accordance therewith, the data comprising a selection of rules and service information specifying the services to which the subscriber MS 2 has access and the conditions in which the services can be accessed (step 1605). In the present example, the SPS 303 query returns the following data:

MS 2
Service applications:
SHR, IN1: both configured to respond to DP2 events
Conditions:
Rule (1) Access SHR first;
Rule (2) If SHR returns Correlation Address for CdPN: (1) replace CdPN with Correlation address; and (2) Access IN1 when call routed via HPLMN.

The event processing engine 143 is then configured in accordance with these conditions (step 1607), effectively enabling it to monitor for data incoming from the SHR, and to respond in accordance with events (1) and (2) should the SHR return a correlation address. Turning back to FIG. 15, at step 1507 the SIF 301 sends a message to the SHR comprising the trigger data (IDP and DP2), and, at step 1509, receives a response from the SHR (the SHR service application having responsibility for determining whether the call should be home routed or not).

In this example, the SHR service application sends a correlation address to the SIF 301, which processes the same in accordance with the steps shown in FIG. 16: at step 1601 the SIF 301 determines that the received data are from the SHR service application, and passes the data to the event processing engine 143 (having previously been configured to monitor for such an input). Next, the event processing engine 143 runs the rules retrieved from the SPS 303 with the received data as input, which in this case comprise data specifying that Home Routing is to be performed, together with a correlation address therefor (step 1611). In accordance with Rule (2), the next action to be performed is sending of the correlation address to the vMSC 107 so as to change the switch with which the subscriber MS 2 is connected, so the event processing engine 143 prepares a message to be sent to the vMSC (step 1613), and then prepares the event processing engine 143 to monitor for the next connected event (step 1615). In this particular scenario, the event processing engine 143 is configured to monitor for the same Initial Detection Point (IDP) as was sent to the SIF 301 at step 1505.

Turning back to FIG. 15, at step 1511 the SIF 301 sends a CONNECT message to the vMSC, directing the vMSC to handover to a switch corresponding to the correlation address (CID). The SIF 301 also sends a TCAP message, closing the dialogue between the SIF 301 and the vMSC 107. At step 1513 the vMSC 107 routes the call to the GMSC, being the switch having a network address corresponding to the correlation address CID, and being located within the Home network (HPLMN). Upon receipt of the connection message, the GMSC sends an IDP message to the SIF 301, the message including the correlation address CID and a new Detection Point DP3 (step 1515). Turning again to FIG. 16, having identified the message as originating from a switch and comprising an Initial Detection Point IDP correlating with the CID previously saved by the SIF 301, the event processing engine 143 runs the rules retrieved from the SPS 303 at step 1603 with the received data as input (step 1611). In accordance with the remaining event (event (2)), and having received a message from a switch in the Home Network (HPLMN), the next action to be performed by the SIF 301 is to send a message to service application IN1, and await a response therefrom. Accordingly, at step 1517, the event processing engine 143 sends a message to IN1 and awaits a reply.

There may be several other events dependent on the output from IN1—depending on the nature of the service application—but the example set out above demonstrates how the SIF 301 can be used to coordinate a SHR service application together with at least one other service application IN1 that is dependent on the same trigger as the SHR (in this example DP2).

Figure 17:
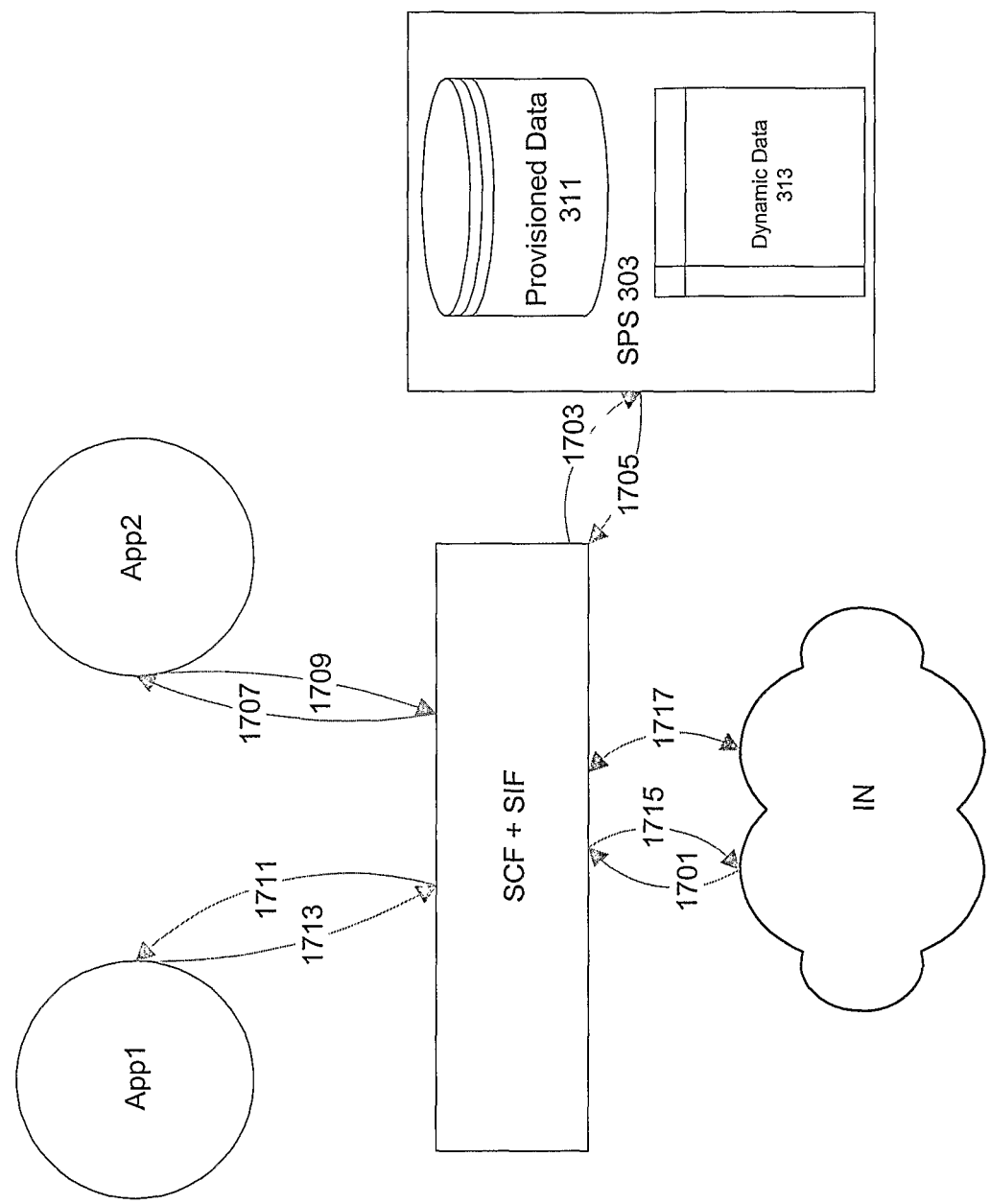
FIG. 17 is a schematic diagram describing steps carried out by the service interaction component shown in FIG. 14 during an inter-OSA event handling process.

The functionality of an event processing system system involving OSA applications only will now be described with reference to FIG. 17 which shows a generic scenario involving processing of incoming triggers from the network. Referring to FIG. 17, at step 1701 an IN event is received by the SCS 103 and passed to the SIF 301, the IN event including data identifying the Calling Party (subscriber) and specifying the type of service trigger (e.g. CAP IDP DP2), together with details of the Called Party (CdPN). Having identified this to be the first such message from the network in relation to the current event processing scenario, the SIF 301 formulates a query (step 1703), using e.g. the Directory Access Protocol (DAP), so as to retrieve data from the SPS 303 corresponding thereto. Upon receipt of the query request, the SPS 303 retrieves data corresponding to the subscriber and trigger from the dynamic data store 313. Referring back to FIG. 9, if registration occurred in accordance with the first arrangement, this step will involve filtering the dynamic data 313 using the provisioned data 311, and for the example shown in FIG. 9, will result in an output of App1 and App2. If registration occurred in accordance with the second arrangement on the other hand, then because subscriber access to a requesting application was checked during the registration process, the SPS 303 simply has to retrieve the contents of the dynamic store 313 (App1 and App2). If registration occurred in accordance with the third embodiment the SPS 303 will retrieve the contents of the dynamic store 313 (App1 and App2) together with preselected interaction rules governing the interaction between App1 and App2.

For cases in which registration has previously occurred in accordance with either the first or the second registration methods, and unlike the third registration method, once the relevant applications (App1, App2) have been identified, the SPS 303 has to perform a separate step of selecting rules and service information specifying the conditions in which the applications can be accessed; irrespective of registration method the now selected interaction rules are then transmitted to the SIF 301 at step 1705. Next, the event processing engine 143 is configured in accordance with these conditions, which, for the purposes of the present example, it can be assumed cause App2 to be invoked before App1. Accordingly at step 1707 App2 is invoked by means of e.g. callEventNotify( ) message, and at step 1709 a response is received and processed by the SIF 301, more specifically the event processing engine 143 (having previously been configured to monitor for such an input when the notify message was transmitted at step 1707). Next, the event processing engine 143 runs the rules retrieved from the SPS 303 at step 1705 with the data received at step 1709 as input. In accordance with the processed rule(s), the event processing engine 143 determines that the next action to be performed is sending of data received at step 1709 to App1, so the event processing engine 143 sends a callEventNotify( ) message to App1 (step 1711), and then prepares the event processing engine 143 to monitor for the next connected event. Having received a response from App1 (step 1713) the event processing engine 143 runs the rules retrieved from the SPS 303 at step 1705 with the data received at step 1713 as input. In accordance with the processed rule(s), the event processing engine 143 determines that the next action to be performed is connection of the calling Party (subscriber) with the Called Party (Mailbox VPS), and accordingly the SIF 301 causes the SCS 103 to send a CONNECT message to the network (step 1715), directing the network to connect the subscriber to his Voice Mailbox VPS, enabling him to access his recorded messages. Step 1717 indicates transmission of further network events in respect of which one or more OSA application has registered an interest.

Figure 18:
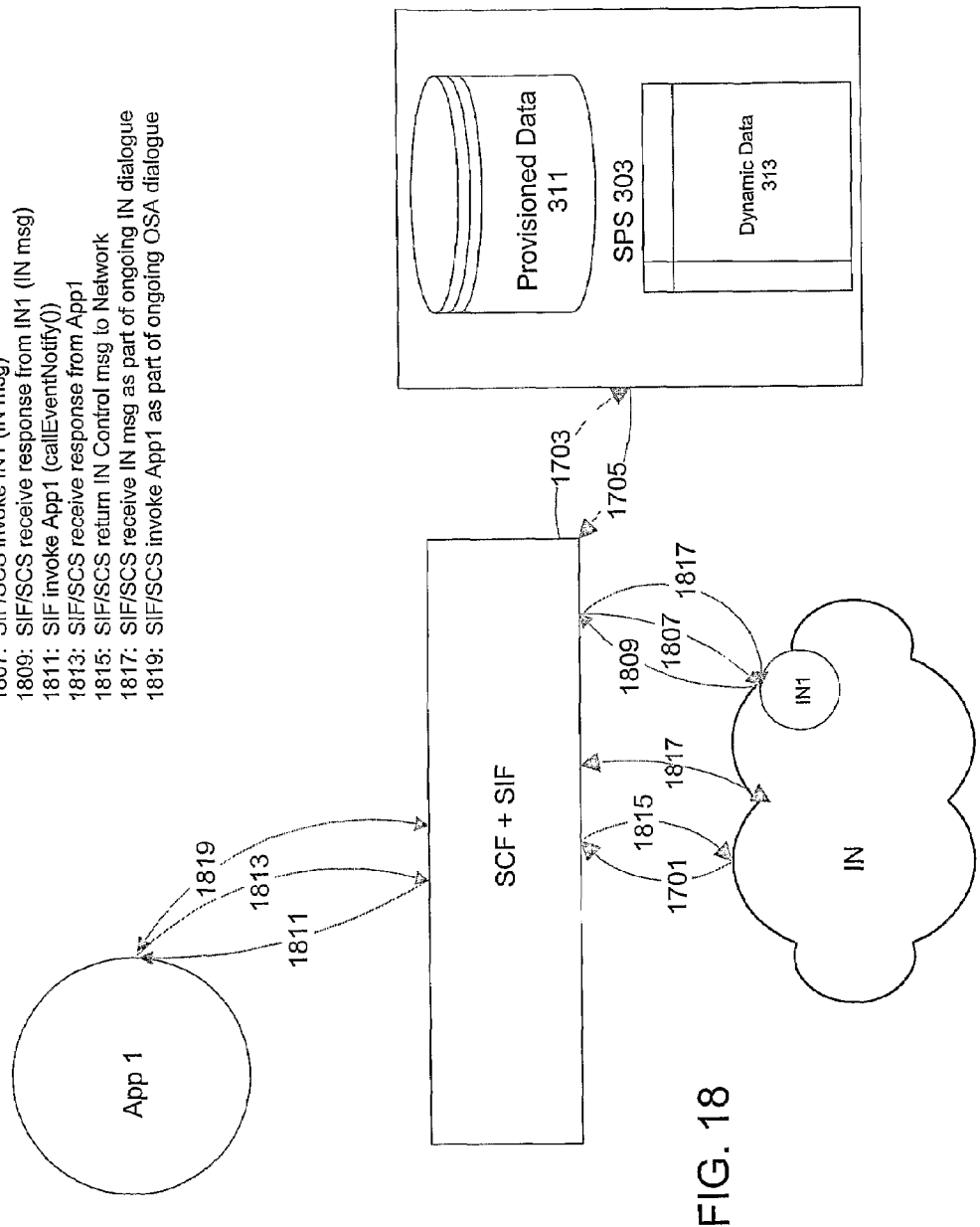
FIG. 18 is a schematic diagram describing steps carried out by the service interaction component shown in FIG. 14 during an OSA-IN event handling process.
Figure 19:
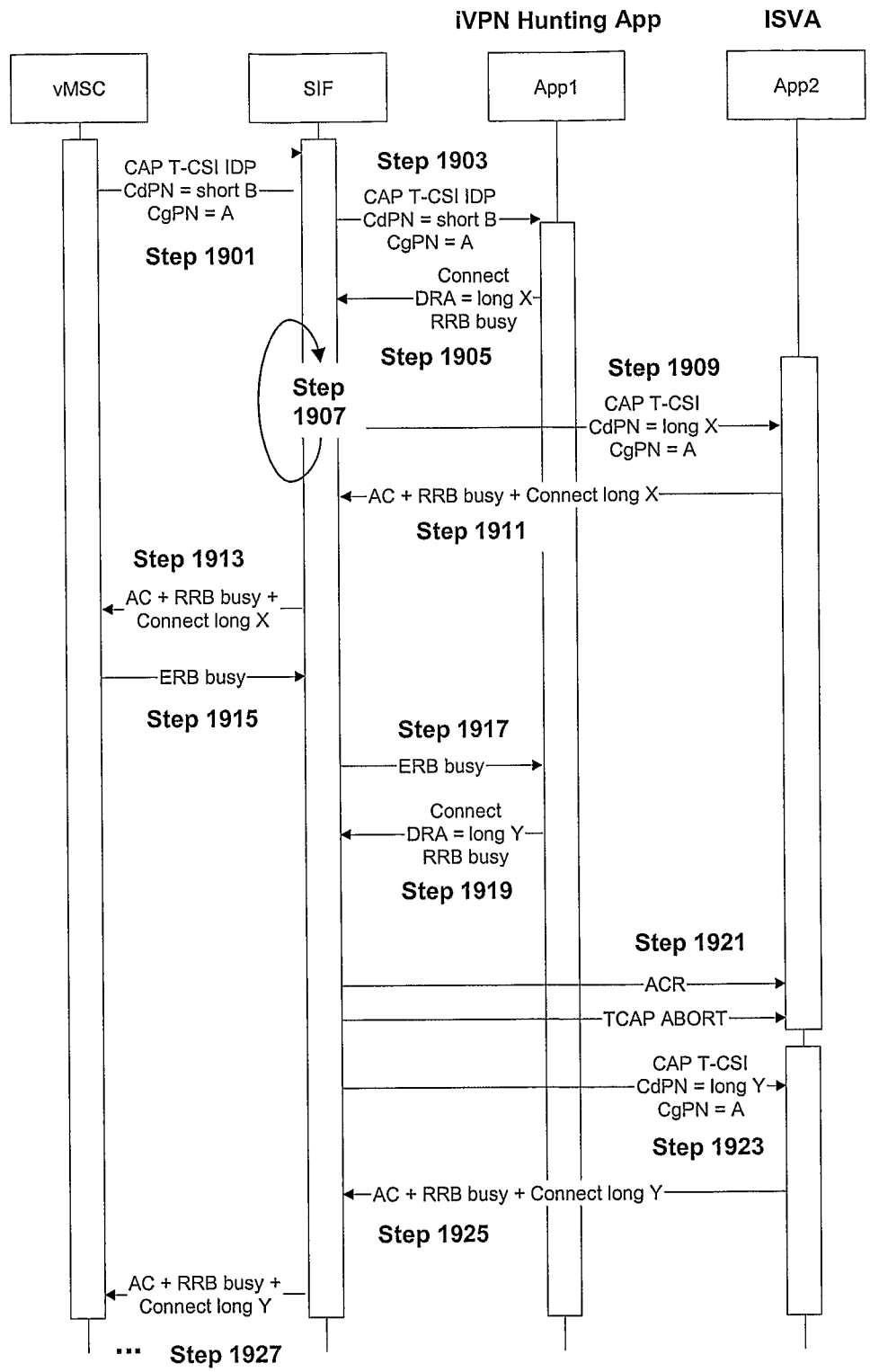
FIGS. 19-23 are schematic diagrams showing further examples of event handling processes according to embodiments of the invention.

FIG. 18 shows an example of an event processing system involving OSA and IN applications, and shows that embodiments of the invention can also be used to control operation of OSA applications and IN services as part of an overall event processing service relating to a network trigger. In this scenario, steps 1701, 1703, 1705 progress as described in relation to FIG. 17, but since, in this example, it is assumed that the trigger in question causes the SPS to solicit data relating both to IN services and OSA applications, the data returned by the SPS 303 will include invocation rules that cause the SCS 103 to interleave transmission of messages to the IN domain with transmission of messages into the OSA domain; a list of the associated steps is set out in the Figure.

From the foregoing examples, it can be seen that an event processing system configured according to embodiments of the invention provide a Service Integration Function that integrates, and controls operation of, a plurality of service applications. In network arrangements comprising a plurality of event processing systems, a central repository of service applications can be developed that are accessible by any one, or a subset, of such SIF according to the access rules assigned to a particular event processing system. In addition, in any given SIF that provides access to a plurality of bespoke and/or legacy service applications, the SIF is configured so as to integrate these applications with one another and with other service applications that are being newly developed. A particularly advantageous feature of embodiments of the invention is that the SIF comprises a means for effectively advertising the functionality thereof, enabling newly developed service applications to utilise such functionality in a proactive manner; this functionality is shown, schematically, as SCS API 148 in FIG. 14.

Further examples illustrating the flexibility associated with embodiments of the invention are presented in FIGS. 19-23, the first of which illustrates the SIF 301 coordinating operation of a hunting application such as iVPN service (App 1) with operation of International Seamless Voice Application (App 2). In this example the hunting application App1 is arranged to ascertain which of a Called Party's (subscriber's) registered devices is active and to provide a number translation service in relation thereto. The example could additionally include a SHR application (either within the SIF or as a separate application (not shown)), which would be used to instruct the vMSC to handover call control to a GMSC, in the manner described in the above examples. In response to receipt of a connection request (step 1901) from the vMSC, the SIF is configured (by means of rules retrieved from the SPS 303, as described above (set out below)) to send a request (step 1903) for a number translation service to App 1. As described above, App 1 is a iVPN hunting application having access to a prespecified list of devices registered for the subscriber, and, in response to the service request message sent from the SIF at step 1903, sends back (step 1905) a translated, full digit number corresponding to a first device in the list, together with a request for an ERB busy message in the event that the device is unavailable. In response to receipt of the translated number of the first device from App1 the SIF sets up a waiting event (step 1907) for an RRB busy message from the vMCS and sends a message (step 1909) to App 2, which includes details of the translated number. App 2 then sends a Connect instruction (step 1911) to the SIF, together with a request for an ERB busy message in the event that the first device is unavailable.

The SIF 301 then consolidates the input from both applications App1, App2 and sends a connection request in respect of the first device to vMSC (step 1913). In the present example the first device is unavailable so the vMSC returns an ERB busy message to the SIF (step 1915); according to the rules applicable in this example, the SIF is arranged to prioritise receipt of ERB busy messages and send them to the hunting application App 1 in the first instance, whilst marking the fact that App 2 needs to be informed of the fact that the first device is unavailable. Having received an ERB busy message the SIF sends the ERB busy message to App 1 (step 1917), which, in response thereto, retrieves and transmits details of a second device in the subscriber's list to the SIF (step 1919). Upon receipt of the identity of this second device (identity long Y), the SIF ends the session with App 2 in relation to the first device (step 1921) and starts a second session in relation to the second device (step 1923). App 2 then sends a Connection request to the SIF (step 1925), this time in relation to the second device (the Connection request being accompanied, as before, with a request for an ERB busy message in the event that the second device is unavailable). The SIF 301 again consolidates input from both applications App1, App2 and sends a connection request in respect of the second device to vMSC (step 1927), and subsequent steps (not shown) proceed in dependence on the availability or otherwise of the second device (i.e. if the second device is unavailable steps 1915-1927 are effectively repeated, whereas if the second device is available, the vMSC proceeds to process the call.

The rules that could be applicable in relation to this further example (as retrieved from the SPS 303 and executable by the SIF 301 to provide the afore-described functionality) are as follows:

In the present example, for CAP T-CSI trigger and subscriber MS 2, the SPS 303 query returns the following service data and sets of conditions:
Service applications:
SHR, Hunting Application (several devices registered), iSVA
Conditions:
Check whether SHR applicable (i.e. is MSC in VPLMN?); If applicable, send correlation address to switch in VPLMN;
Rule (1): Access Hunting appln first;
Rule (2): If the response from the Hunting application indicates a connect with a destination routing address (DRA) set (corresponding to a first device), modify the Called Party Number in the IDP to be the DRA and send the modified IDP to the ISVA application. Otherwise, or in any other event, send the unmodified IDP to ISVA.
Rule (3): If response from ISVA service (CdPN), store CdPN until MS 2 connected to switch in HPLMN;
Rule (4): If Hunting appln and ISVA both request RRB busy messages, send any received ERB busy messages to Hunting appln, retrieve new destination routing address (i.e. DRA corresponding to second device), end dialogue with ISVA on the basis of the first DRA, and send modified DRA to ISVA.
Rule (5): Once MS 2 connected via HPLMN, send Connect message to switch in HPLMN.

Figure 20:
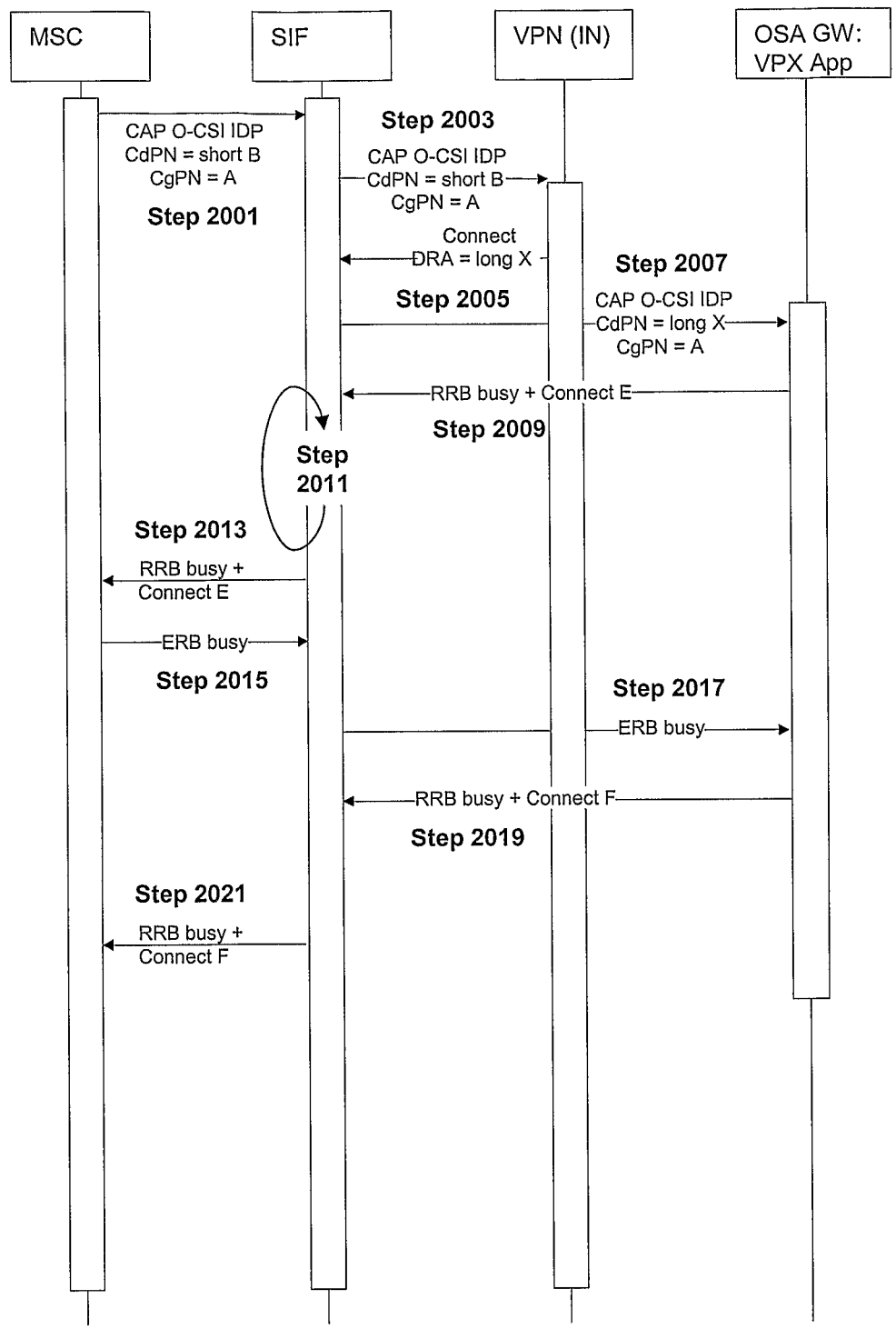

A further example will now be described, with reference to FIG. 20, which shows another example of the SIF 301 coordinating operation of an intelligent service node (VPN) with an OSA service node (hunting application VPX). In this example it is assumed that the subscriber has already subscribed to a VPN service as an intelligent network service, and wishes for this to be integrated with his newly taken up OSA services. Accordingly, and turning to FIG. 20, in response to receipt of a connection request (step 2001) from the MSC, the SIF is configured (by means of rules retrieved from the SPS 303, as described above) to send a request (step 2003) to the VPN service. In response, the VPN sends back (step 2005) a full digit number corresponding to the called party number. In response, the SIF sends a message (step 2007) to VPX, which includes details of the full digit number. The VPX application sends a Connect instruction (step 2009), in respect of the first device corresponding to the full digit number of the called party (identity E), to the SIF, together with a request for an ERB busy message in the event that the first device is unavailable. The SIF sets up a waiting event (step 2011) for an RRB busy message from the MCS, consolidates the input from both applications VPN, VPX and sends a connection request in respect of the first device to MSC (step 2013). In the present example the first device is unavailable so the MSC returns an ERB busy message to the SIF (step 2015), causing the SIF to send the ERB busy message to VPX (step 2017), which, in response thereto, retrieves and transmits details of a second device in the subscriber's list to the SIF (step 2019). Upon receipt of the identity of this second device (identity F), the SIF sends a connection request in respect of the second device to MSC (step 2021), and subsequent steps (not shown) proceed in dependence on the availability or otherwise of the second device (i.e. if the second device is unavailable steps 2017-2021 are effectively repeated).

Figure 21:
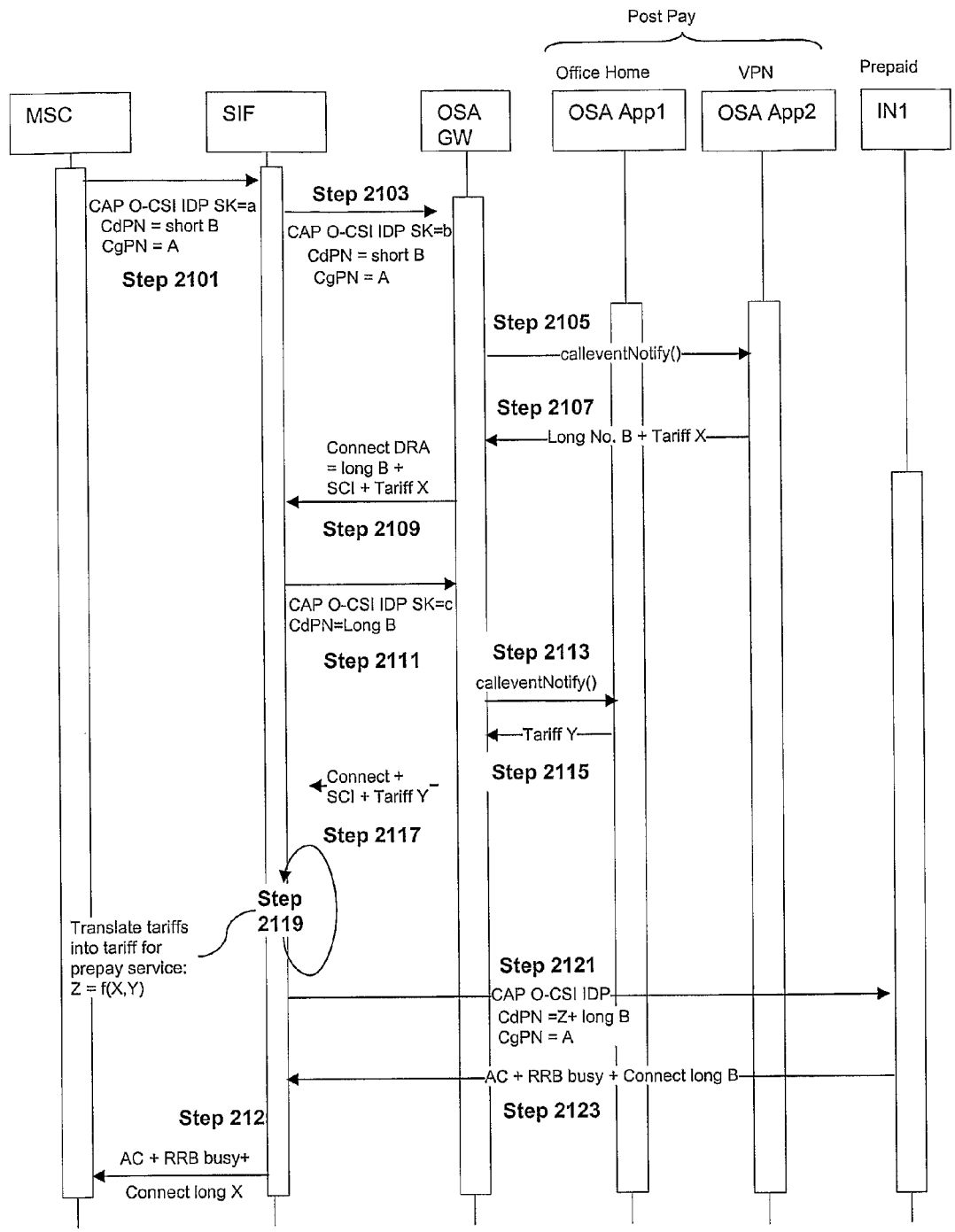

Another example is shown in FIG. 21, which shows use of the SIF 301 to coordinate operation of post pay and prepaid services: in this example the SIF 301 is configured to perform processing in respect of the post pay tariffs in order to modify them into a format suitable for a prepaid service. Such post pay applications include a VPN application and an "Office Zone" application, the latter of which identifies the location of a subscriber and modifies the standard tariff (i.e. VPN tariff) in dependence thereon. In response to receipt of a connection request (step 2101) from the MSC, the SIF firstly identifies, on the basis of the service key SK(a) accompanying the connection request and the data requested from the SPS 303, that the subscriber is of the prepaid type, who has been granted access to various post pay OSA services (each being identifiable via service keys SK(b) and SK(c) respectively). Accordingly, at step 2103, the SIF 301 is configured to send a request to the Gateway 101, identifying the application to be queried at this stage by means of service key SK(b); upon receipt of the service key SK(b) and associated call data, the Gateway 101 sends a calleventNotify( ) message to the application corresponding to service key SK(b), which in this case is App 2 (step 2105). App 2 is a VPN hunting application having access to a prespecified list of devices registered for the subscriber, and, in response to the service request message sent from the GW 101, sends back (step 2107) a translated, full digit number corresponding to a first device in the list, together with a tariff associated with this service. In view of the fact that App 2 is a post pay application, the OSA GW 101 packages the tariff information with associated SCI charging response message and sends this onto the SIP (step 2109). In accordance with the rules sent from the SPS 303, the SIF then identifies that the next application to be queried is the Office Home application App 1, and sends a request to the Gateway 101, the request including data identifying App 1 by means of service key SK(c) and data identifying the called party (step 2111); upon receipt of the service key SK(c), the Gateway 101 recognises that the request is to be sent to the office Application App1 and sends the called party number (Long B) thereto (step 2113). In response, App 1 sends data indicative of a tariff associated with the location of the calling party—tariffY—to the SIF, via the OSA GW 101 (steps 2115, 2117). Once in receipt of the disparate tariff information, the SIF processes the data in order to identify a tariff suitable for providing the subscriber with these services—in his capacity as a prepaid subscriber type (step 2119). The output of this evaluation process is the transmission of a message comprising combined tariff data and service request to the prepaid service IN1 (step 2121). Once received, the prepaid service IN1 performs the standard charge evaluation process and (assuming the subscriber to have sufficient funds) sends a request for call connection and request for busy message (step 2123) to the SIF 301. In response thereto, the SIF 301 sets up a waiting event for an RRB busy message from the MSC and sends a connection request in respect of the first device to the MSC.

Figure 22:
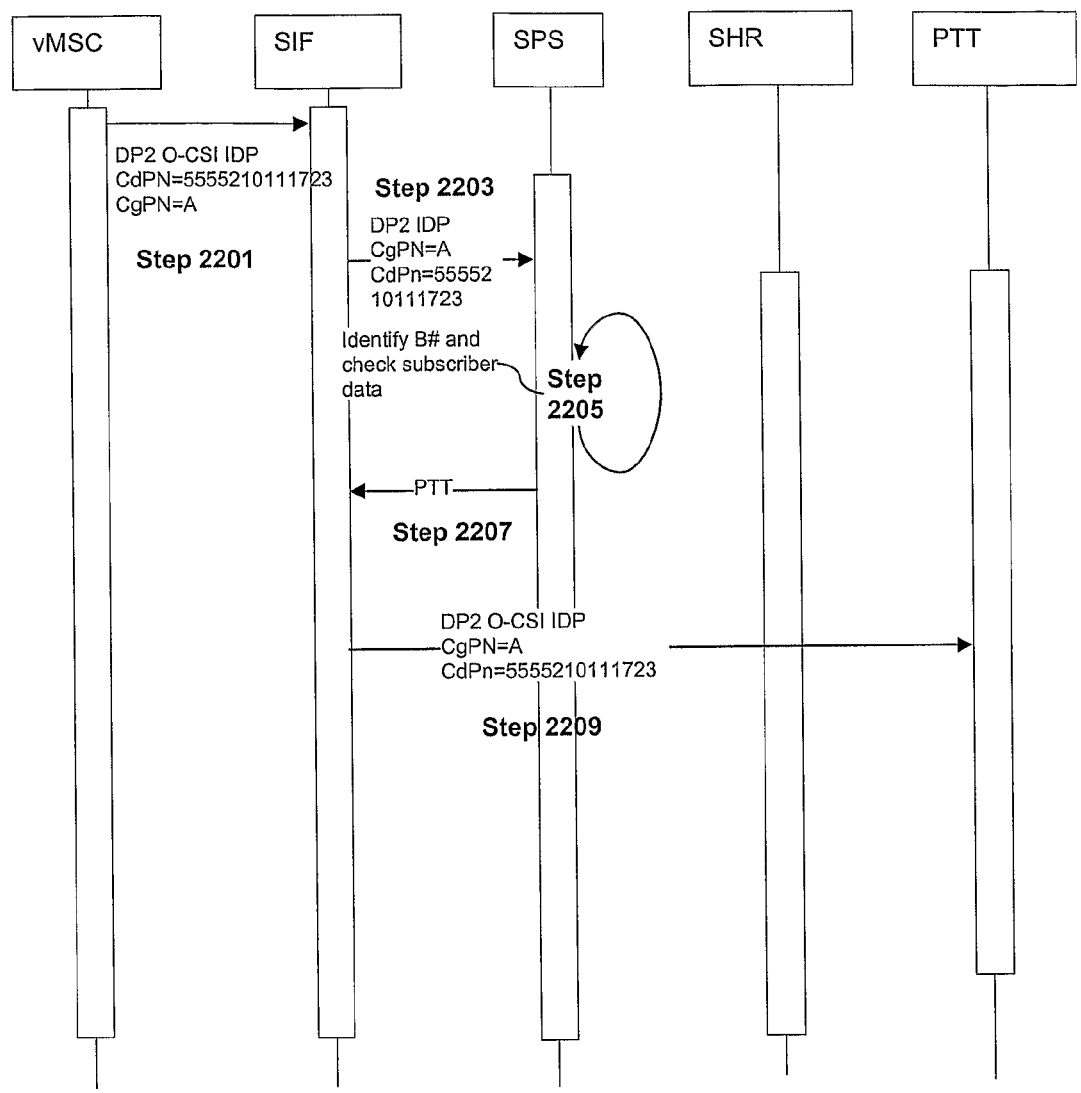

A yet further example is shown in FIG. 22, which shows interactions between the SIP 301 and SPS 303 (this having been assumed to already have been performed in the preceding examples) as well as interactions with service nodes in the network. In this example the SIF 301 and SPS 303 elegantly interwork in order to solve a problem experienced by subscribers roaming in a network that is not Camel 3, namely that which arises when the HLR 115 only sends O-CSI services to the VLR. When only equipped with O-CSI services the vMSC cannot discriminate between calls having specified prefixes and events that need home routing (and other services); as a result calls having a prefixed unrecognized by the vMSC are incorrectly handled. (These prefixes are called the "B#", and the corresponding events need N-CSI/D-CSI service data for the VLR to know that a call should be processed by a Push-To-Talk service node.) In this example it is assumed that the SPS 303 is provisioned so as to be able to identify whether an incoming call should be sent to a Push-to-Talk node or Home Routed, based on the B#—essentially keying the data on the basis of B# in addition to subscriber and trigger data. Referring then to FIG. 22, at step 2201 the vMSC sends a message to the SIF, the message including a B# as a prefix to the Called Party number. In response, the SIF 301 contacts the SPS 303, requesting service-specific information in relation to the Called Party number (step 2203) and the subscriber. At step 2205 the SPS 303 performs some internal processing, comparing the prefix with data stored in respect of this subscriber in relation to B# services. In the event that the stored data indicates that this subscriber has subscribed to Push-to-Talk services, data indicative of the service will be sent to the SIF 301 (step 2207), which enables the SIF 301 to send a somewhat identical message to the correct service (here PTT). If the subscriber had not invoked the PTT service, the SPS 303 would instead send data indicating that the call should be Home Routed, causing the SIF 301 to communicate with the SHR node shown in FIG. 22.

Figure 23:
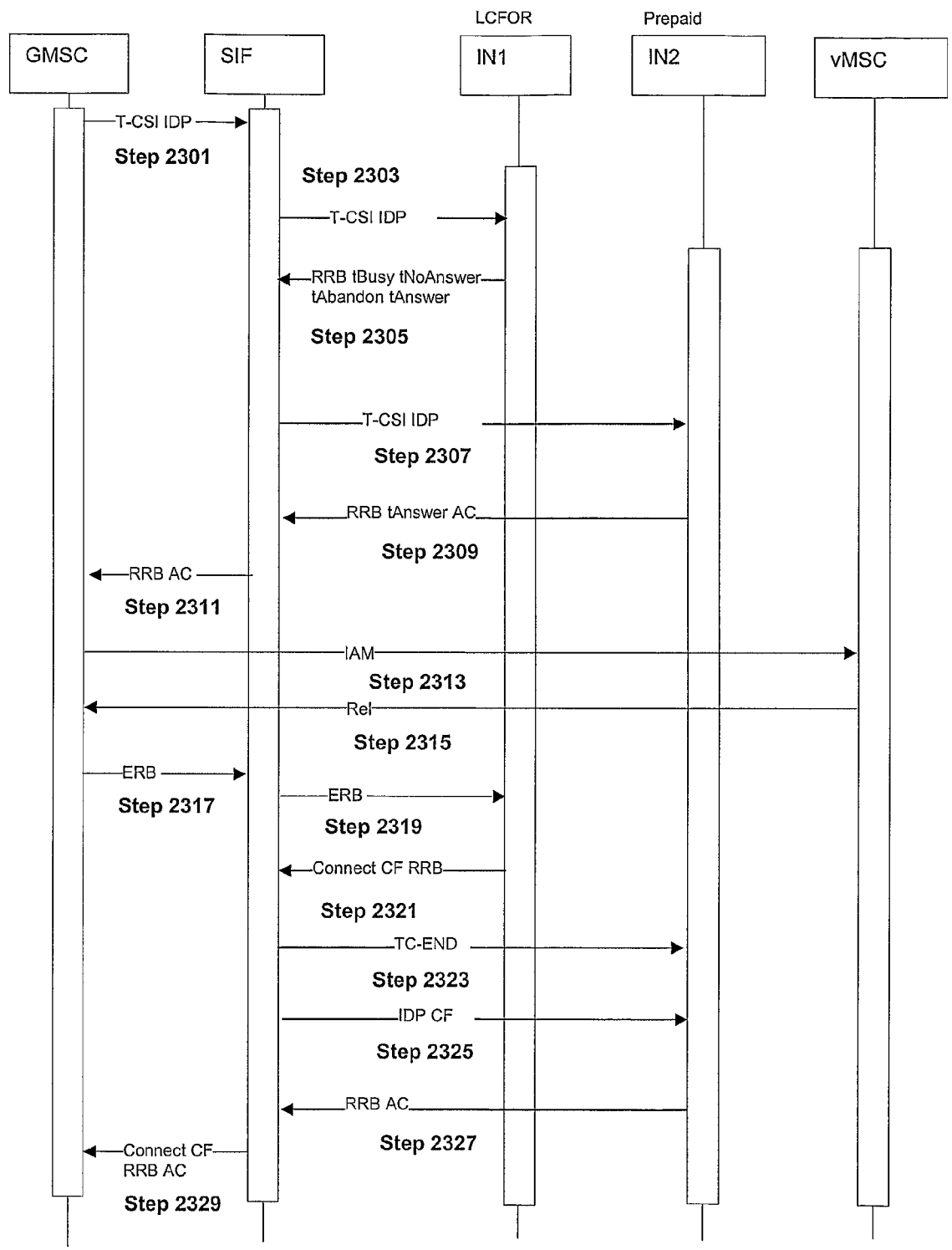

A yet further example is shown in FIG. 23, which shows the SIF 301 controlling Late Call Forwarding (LCFOR) in conjunction with a prepaid service IN2 so as to avoid the situation in which, when party A calls party B and party B is roaming, a voice circuit is set up between the switch to which party A is connected (in the home network); the vMSC associated with party B in the visited network; and a service node associated in the home network to which the subscriber has access. Referring then to FIG. 23, at step 2301a terminating call detection point is received by the SIF 301 from the Gateway MSC; the SIF 301 requests data corresponding to the subscriber from the SPS 303, and, identifying that the subscriber has subscribed to a LCFOR service in addition to a further service IN2 (unspecified), the SIF 301 identifies that it needs to invoke the LCFOR node first. Accordingly, at step 2303 the SIF 301 sends data indicating that the call is a terminating call to the LCFOR service node, which sends a request for an ERB busy message/No answer/abandoned/answered message to the SIF 301 at step 2305. The SIF 301 registers, internally, that it needs to monitor for any such ERB messages from the MSC once control of the call is passed to the Gateway MSC, and sends a message to the other service node (one is shown: IN2) to which the called subscriber has access (step 2307). The service node IN2 sends a charging message and request for an ERB answer message to the SIF 301 in respect of a call being answered (step 2309), causing the SIF 301 to register that it needs to monitor for calls being answered, and inform the service node IN2. The SIF 301 then instructs the GMSC to continue progressing the call (step 2311), causing the GMSC to connect to the vMSC (step 2313). In response to the call being answered, the GMSC sends an ERB message to the SIF (step 2317); in view of the fact that the LCFOR node registered for such a message at step 2305, the SIF 301 forwards the message to the LCFOR node at step 2319, which, in response, sends an instruction for Call Forwarding to the SIF (step 2321). In response to receipt of this message the SIF 301 ends the previously active session with the IN2 node at step 2323, and instead starts a session in respect of a Call Forwarding event (step 2325). Call charging in respect of such a call forwarding event is then configured and the SIF 301 instructs the GMSC to connect to the Forwarded Number at step 2329.

ADDITIONAL EMBODIMENT DETAILS

Whilst the embodiments have described SS7 call processing, embodiments of the invention could be applied to other types of network events, including SIP (Service Initiation Protocol) call processing and message processing.

Additionally, operation of the SIF 301 may be initiated by method invocation through an API—e.g. CORBA, SOAP so that the SIF can provide a service brokering facility across the IN service applications.

Whilst the SIF 301 is described as a single entity, it will be appreciated that such an entity can be distributed over a plurality of processing components.

The above embodiments are to be understood as illustrative examples of the invention, and further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An event processing apparatus for use in processing service initiation request messages in an event processing system, the apparatus being connectable to a plurality of service nodes from which a subscriber is able to receive service during processing of a network event, each service node being capable of transmitting a service response message comprising data particular to operation of the service node, the apparatus comprising:
a function arranged, on receiving a first service initiation request message sent by a serving node in a network currently involved in processing of the network event, to:
access a storage system to retrieve attribute data corresponding to said first service initiation request message for the subscriber, the attribute data specifying a plurality of service nodes corresponding to said first service initiation request message and rules defining interaction therebetween, wherein the storage system is configured to store a plurality of said rules, each relating to a particular combination of service nodes, and wherein a subscriber record in the storage system is updated to reference a said rule in response to a change in service nodes registered for the subscriber,
request service response messages from said plurality of service nodes, and,
control operation of at least some of the plurality of service nodes involved in processing of the same network event on the basis of the attribute data and data contained in the service response messages,
wherein, in the event that the data contained within a service response message received from one of the plurality of service nodes is indicative of a request for a signaling resource that overlaps or conflicts with data contained within a service response message received from another of the plurality of service nodes, the function is arranged to process the data contained within respective service response messages on the basis of said attribute data so as to enable access to the requested signaling resource by said service node and the another service node involved in processing of the same network event.

2. The event processing apparatus according to claim 1, wherein, on the basis of the content of the service response message, the function is arranged to control operation of a given service node more than once during the same network event.

3. The event processing apparatus according to claim 1, wherein the function is arranged to send a service request message to respective service nodes, at least one service request message comprising data indicative of one or more service initiation triggers corresponding to the first service initiation request.

4. The event processing apparatus according to claim 3, wherein the function is arranged to modify the at least one service initiation trigger and to formulate a service request message on the basis of the modified service initiation trigger.

5. The event processing apparatus according to claim 1, wherein the function is arranged to monitor for the receipt of further service initiation request messages as a result of the operation.

6. The event processing apparatus according to claim 1, wherein the function is arranged to monitor for the receipt of further response messages as a result of the operation.

7. The event processing apparatus according to claim 1, wherein, on receiving a second service initiation request message sent by a serving node in the network currently involved in processing of the same network event, the function is arranged to control operation of at least one of the plurality of service nodes, and as a result of the operation, to transmit a service response message to the serving node from which the second service initiation request message is received.

8. The event processing apparatus according to claim 7, wherein the first service initiation request message is received from the same serving node as that from which the second service initiation request message is received.

9. The event processing apparatus according to claim 1, wherein the service initiation request message includes data identifying the corresponding service initiation trigger, and the function is arranged to access data identifying service nodes corresponding to the service initiation trigger, for use in controlling operation thereof.

10. The event processing apparatus according to claim 1, wherein the function is arranged to generate a service request message in dependence on data associated with the subscriber and the data contained in the first service initiation request message.

11. The event processing apparatus according to claim 5, wherein the further service initiation request message comprises trigger data which is different than trigger data contained within the service initiation request message.

12. The event processing apparatus according to claim 1, wherein the function is arranged to request the service response messages during allocation of network resources associated with the network event.

13. The event processing apparatus according to claim 1, wherein the function is arranged to modify the at least one service initiation trigger and to formulate a service request message on the basis of the modified service initiation trigger.

14. The event processing apparatus according to claim 1, wherein, in response to receiving the first service initiation request message, the apparatus is arranged to transmit second service initiation request messages to two or more of the service nodes in a selected sequence.

15. The event processing apparatus according to claim 14, wherein the selected sequence is dependent on service node response messages received from the plurality of service nodes.

16. The event processing apparatus according to claim 1, wherein the apparatus comprises a monitoring function arranged to monitor for a service response message from a first one of the service nodes and the apparatus is arranged to transmit a second service initiation request message to a second one of the service nodes in response to the service response message.

17. The event processing apparatus according to claim 1, wherein the apparatus is arranged to invoke a monitoring function in response to the receipt of service node response messages from the first service node.

18. The event processing apparatus according to claim 17, wherein the data for use by the monitoring function are dependent, at least in part, on data included in the service node response message received from the first service node.

19. The event processing apparatus according to claim 18, wherein the second service node is different from the first service node.

20. The event processing apparatus according to claim 16, wherein the monitoring function is arranged to monitor for a service initiation request message sent from a serving node other than the serving node from which the first service initiation request messages were sent.

21. The event processing apparatus according to claim 20, wherein at least one second service initiation request message sent to a first service node in the predetermined set of different service nodes is the same as another second service initiation request message sent to a second service node in the predetermined set of different service nodes.

22. The event processing apparatus according to claim 21, wherein the second service initiation request messages are of the same type as the first service initiation request message.

23. The event processing apparatus according to claim 22, arranged to generate a service instruction message in response to a service node response message, the service instruction message including data requesting a change to the serving node involved in the event processing, wherein the apparatus is arranged to transmit the service instruction message to the serving node from which the first service initiation request message was received.

24. The event processing apparatus according to claim 23, wherein the generated service instruction message comprises data instructing the serving node to handover the network event to a different serving node.

25. The event processing apparatus according to claim 24, wherein the different serving node is located in a different network to that within which the serving node is arranged to operate.

26. The event processing apparatus according to claim 25, wherein one of the service nodes is a gateway node providing access to a plurality of further service nodes beyond the gateway.

27. The event processing apparatus according claim 26, wherein the service nodes provide one or more of: number translation services, message handling services, message modification services, message routing services, voicemail services, call diversion services, and device hunting services.

28. The event processing apparatus according to claim 1,
wherein the apparatus is responsive to receipt of one of the service registration request messages sent from a registering service node to store registration data indicative of the registered service node and corresponding service initiation trigger in association with the subscriber, the registration data being for use in processing service initiation request messages sent from the serving node in respect of the subscriber,
the apparatus being arranged to store registration data for a plurality of service registration request messages each identifying a different service node and the same subscriber,
wherein the apparatus is arranged to define an order of precedence between the different service nodes after the registration data have been received.

29. The event processing apparatus according to claim 28, wherein the apparatus is arranged to store the registration data if the registration request message is received from a service node identified as accessible to the subscriber.

30. The event processing apparatus according to claim 28, wherein in response to receipt of a second and subsequent registration request message the apparatus is arranged to retrieve interaction data specifying interactions between corresponding two or more service nodes and to store the interaction data, thereby defining an order of precedence between the different service nodes.

31. The event processing apparatus according to claim 28, wherein in response to receipt of the service initiation request message the apparatus is arranged to retrieve interaction data specifying interactions between corresponding two or more service nodes, thereby defining an order of precedence between the different service nodes.

32. The event processing apparatus according to claim 28, wherein the apparatus is arranged to store further registration data in respect of a further service registration request message identifying a further different service node and the same subscriber, the further service registration request message being received subsequently, the apparatus being arranged to define an order of precedence between the different service nodes after the further registration data have been stored.

33. The event processing apparatus according to claim 28, wherein the plurality of service registration request messages are received at different times.

34. The event processing apparatus according to claim 28, the apparatus being in operative association with a function arranged, on receiving a first service initiation request message sent by a serving node in a network currently involved in processing of the network event, to request service response messages from at least one of the registered service nodes, and to control operation of at least some of the plurality of registered service nodes involved in processing of the same network event on the basis of content of the service response messages.

35. The event processing apparatus according to claim 28, wherein the service initiation request message includes data identifying the corresponding service initiation trigger, and the function is arranged to access data indicative of the order of preference between the different service nodes, for use in controlling operation thereof.

36. The event processing apparatus according to claim 28, wherein the registration data identifies a plurality of subscribers of whom the registration request relates, respectively.

37. In a network having a plurality of service nodes from which a subscriber is able to receive service, each of the service nodes being configured to transmit a service response message comprising data particular to the operation of the service node, a method of processing service initiation requests during a network event, the method comprising:
receiving a first service initiation request message sent by a serving node in the network, the serving node being currently involved in processing of the network event;
responsive to said first service initiation request message, accessing a storage system to retrieve attribute data corresponding to said first service initiation request message for the subscriber, the attribute data specifying a plurality of service nodes corresponding to said first service initiation request message and rules defining interaction therebetween, wherein the storage system is configured to store a plurality of said rules, each relating to a particular combination of service nodes, and wherein a subscriber record in the storage system is updated to reference a said rule in response to a change in service nodes registered for the subscriber;

requesting service response messages from at least a first service node and a second service node;

receiving service response messages from the first service node and second service node;

controlling operation of at least the first service node and the second service node on the basis of the attribute data and data contained in the received service response messages, wherein, in the event that data contained within the service response message received from the first service node is indicative of a request for a signaling resource that overlaps or conflicts with data contained within the service response message received from the second service node, processing the data contained within the received service response messages based on said attribute data which enables access to the requested signaling resource by each of the first service node and the second service node.

* * * * *

UNITED STATES PATENT AND TRADEMARK OFFICE
CERTIFICATE OF CORRECTION

| | | |
|---|---|---|
| PATENT NO. | : 8,472,945 B2 | Page 1 of 1 |
| APPLICATION NO. | : 11/547985 | |
| DATED | : June 25, 2013 | |
| INVENTOR(S) | : Dominic O'Neill et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1457 days.

Signed and Sealed this
Twenty-third Day of June, 2015

Michelle K. Lee
*Director of the United States Patent and Trademark Office*